US008514685B2

(12) United States Patent
Sirat

(10) Patent No.: US 8,514,685 B2
(45) Date of Patent: Aug. 20, 2013

(54) OPTICAL DEVICES BASED ON INTERNAL CONICAL DIFFRACTION

(75) Inventor: Gabriel Y. Sirat, Rehovot (IL)

(73) Assignee: BioAxial SAS, Paris (FR)

( * ) Notice: Subject to any disclaimer, the term of this patent is extended or adjusted under 35 U.S.C. 154(b) by 559 days.

(21) Appl. No.: 12/255,528

(22) Filed: Oct. 21, 2008

(65) Prior Publication Data

US 2009/0168613 A1 Jul. 2, 2009

Related U.S. Application Data

(63) Continuation-in-part of application No. PCT/IB2007/004201, filed on Oct. 19, 2007, which is a continuation of application No. PCT/US2007/022379, filed on Oct. 22, 2007.

(60) Provisional application No. 60/862,214, filed on Oct. 20, 2006.

(51) Int. Cl.
*G11B 7/00* (2006.01)

(52) U.S. Cl.
USPC ............ 369/112.01; 369/112.16; 369/112.17; 359/369; 359/364; 359/365

(58) Field of Classification Search
USPC 369/112.16, 112.17, 112.23, 112.01–112.03; 356/365, 138, 369, 364; 372/105, 106; 359/489.15; 250/491.1
See application file for complete search history.

(56) References Cited

U.S. PATENT DOCUMENTS

| | | | |
|---|---|---|---|
| 2,623,165 A | 12/1952 | Mueller et al. | |
| 4,461,543 A | 7/1984 | McMahon | |
| 4,502,762 A | 3/1985 | Anderson | |
| 4,976,504 A | 12/1990 | Sirat et al. | |
| 5,107,512 A | 4/1992 | Shibutani | |
| 5,432,807 A * | 7/1995 | Okazaki et al. | 372/22 |
| 5,587,793 A | 12/1996 | Nakai et al. | |
| 5,631,774 A * | 5/1997 | Yoshizawa | 359/640 |
| 5,694,382 A * | 12/1997 | Oliver et al. | 369/53.24 |
| 5,694,385 A * | 12/1997 | Takahashi et al. | 369/44.23 |
| 5,698,120 A | 12/1997 | Kurosawa et al. | |
| 5,898,661 A * | 4/1999 | Morimoto | 369/110.03 |
| 5,912,748 A * | 6/1999 | Wu et al. | 398/49 |
| 5,982,731 A * | 11/1999 | Nishi et al. | 369/110.02 |
| 6,704,340 B2 | 3/2004 | Ershov et al. | |
| 6,710,875 B1 | 3/2004 | Zavislan | |
| 7,034,938 B1 | 4/2006 | Miles et al. | |
| 7,079,247 B2 | 7/2006 | Shribak et al. | |
| 7,541,600 B2 * | 6/2009 | Neuhauser et al. | 250/491.1 |
| 2001/0024417 A1* | 9/2001 | Yanagawa et al. | 369/112.19 |
| 2005/0057747 A1 | 3/2005 | Meeks | |
| 2005/0265151 A1* | 12/2005 | Kimura et al. | 369/44.37 |
| 2006/0193044 A1* | 8/2006 | Blum et al. | 359/487 |

OTHER PUBLICATIONS

International Search Report and Written Opinion for Application No. PCT/US2007/022379, mailing date Apr. 2, 2008, 10 pages.
International Search Report and Written Opinion for Application No. PCT/IB2007/004201, mailing date Dec. 10, 2008, 15 pages.

\* cited by examiner

*Primary Examiner* — Thomas Alunkal
(74) *Attorney, Agent, or Firm* — Sunstein Kann Murphy & Timbers LLP

(57) ABSTRACT

Optical devices based on internal conical refraction for developing new set-ups, methods and applications based on the specific properties of internal conical diffraction. The devices include several set-ups, methods and applications consisting of biaxial crystal(s)—one or more polarization elements and optical elements. The biaxial crystal is an optical crystal which may belong to the trigonal, orthorhombic or trigonal crystal classes.

21 Claims, 21 Drawing Sheets

Figure 2
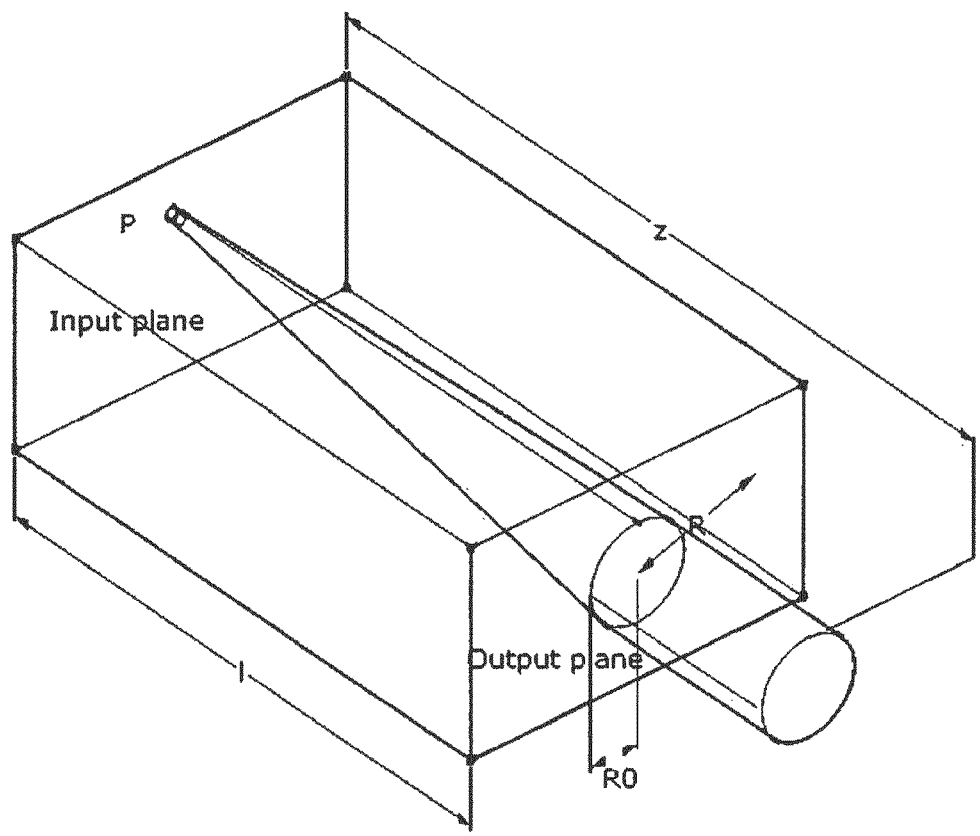
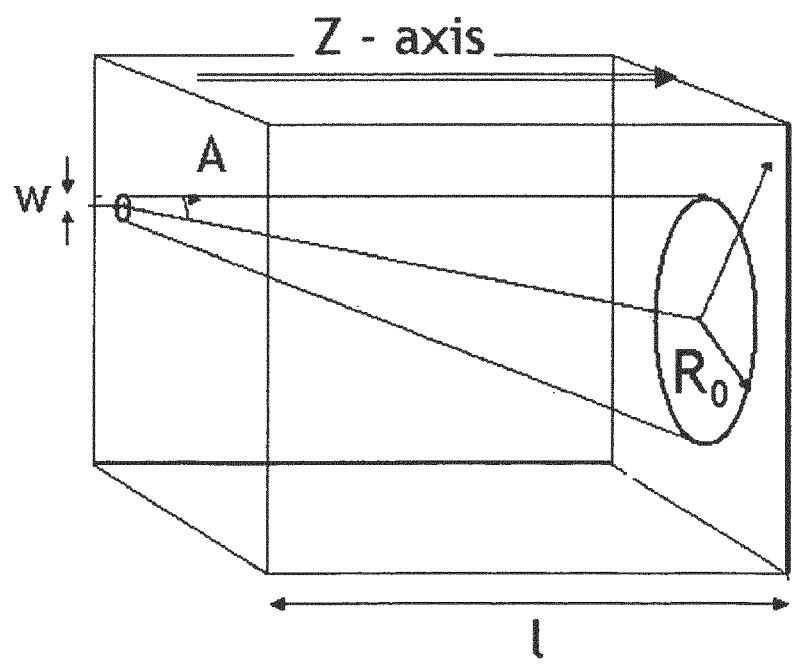

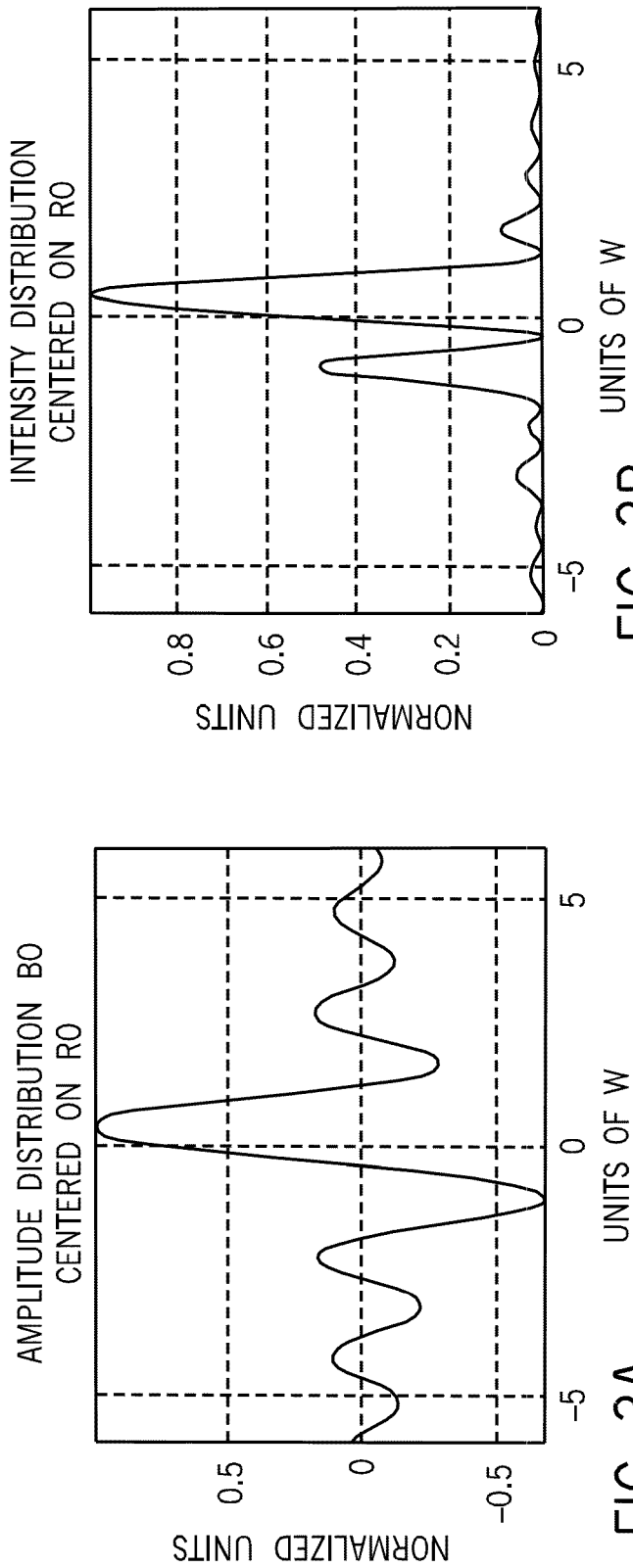
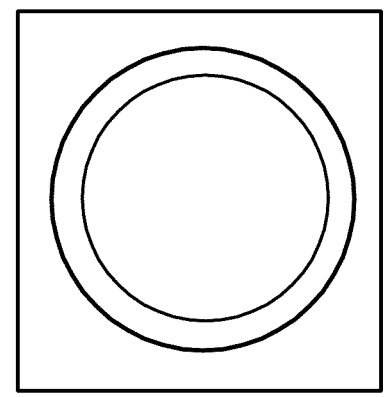

Figure 8
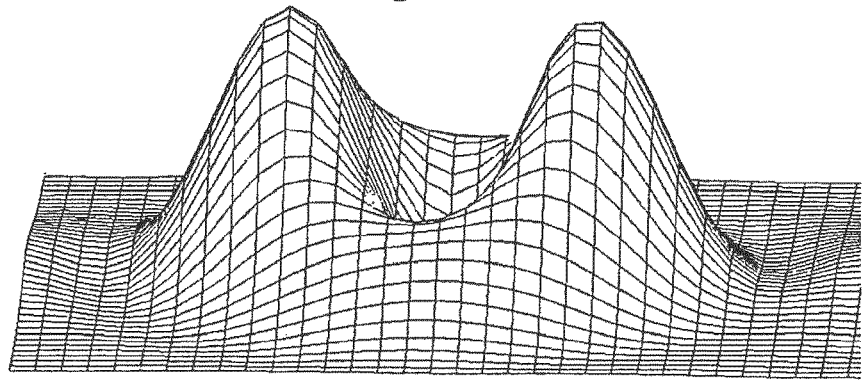
(a)
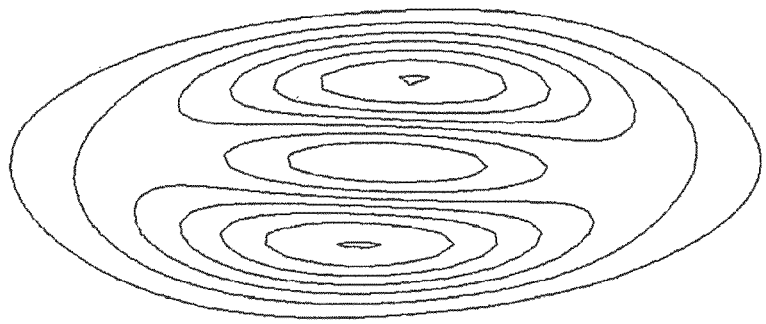
(b)
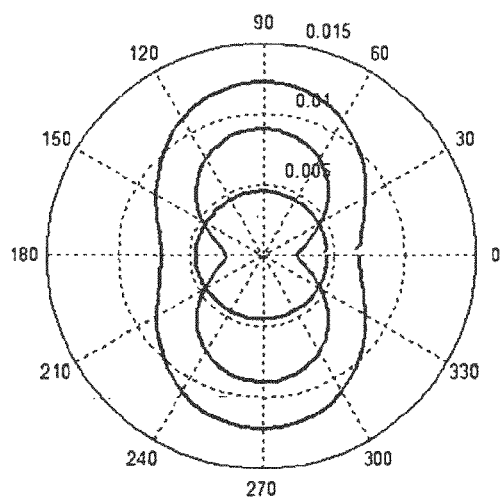
(c)

(a)

(b)

Figure 14-1
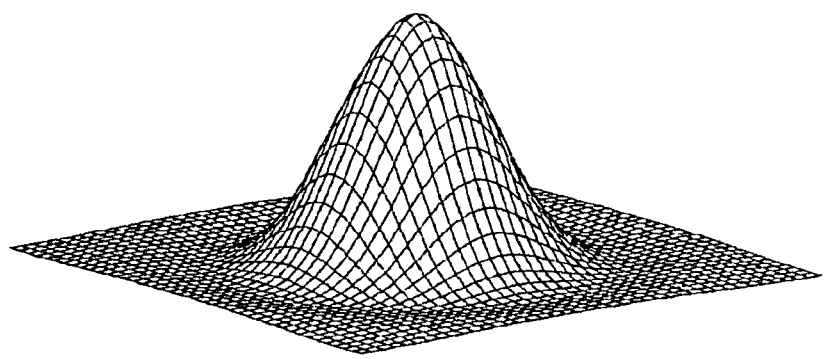
FIG.14(a)
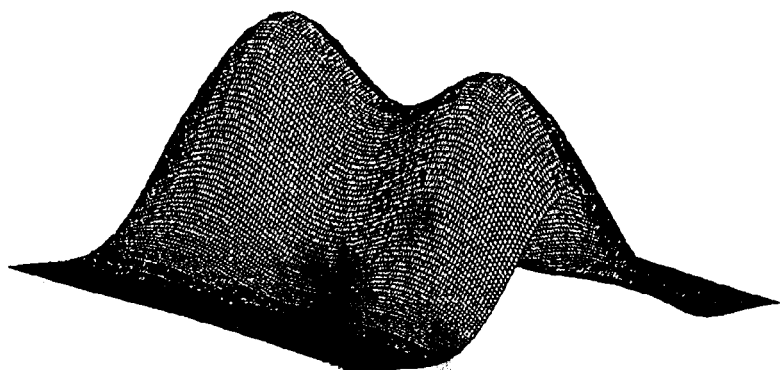
FIG. 14(b)

Figure 14-2
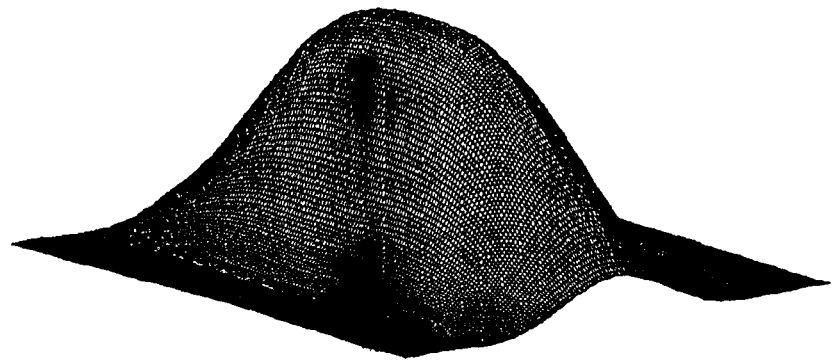
FIG. 14(c)
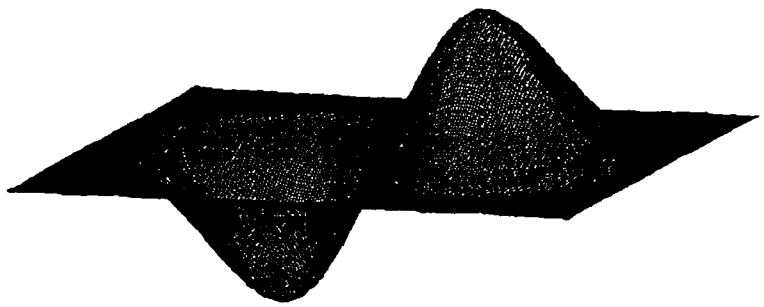
FIG. 14 (d)

Figure 14-3
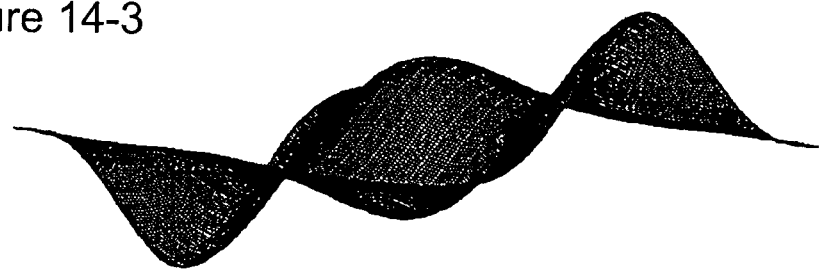
FIG. 14 (e)
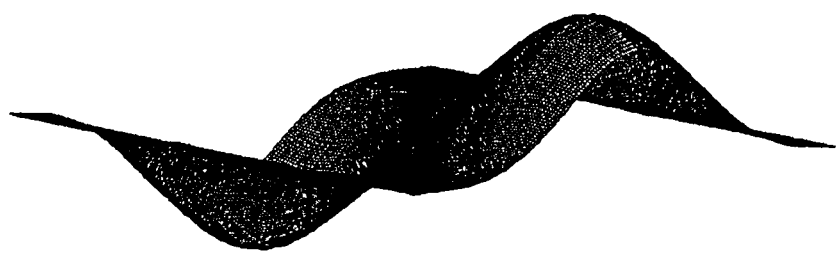
FIG. 14 (f)

US 8,514,685 B2

OPTICAL DEVICES BASED ON INTERNAL CONICAL DIFFRACTION

CROSS-REFERENCE TO RELATED PATENT APPLICATIONS

This application is a Continuation-In-Part of Application PCT/IB2007/004201, filed Oct. 19, 2007 entitled "Optical Devices Based On Internal Conical Diffraction", incorporated herein by reference in its entirety, which claims the benefit of U.S. Provisional Application 60/862,214, filed Oct. 20, 2006 which is incorporated herein by reference in its entirety. This application is a Continuation of Application PCT/US2007/022379, filed Oct. 22, 2007 entitled "Optical Devices Based On Internal Conical Diffraction", incorporated herein by reference in its entirety, which claims the benefit of U.S. Priority Application 60/862,214, filed Oct. 20, 2006 which is incorporated herein by reference in its entirety.

BACKGROUND OF THE INVENTION

The present invention relates generally to optical devices and methods using such devices, and more specifically it relates to optical devices based on internal conical refraction and methods using such devices in imaging.

Optical devices are used in numerous scientific, technological and industrial activities and in countless applications. For all these optical devices, only a very small number of basic concepts exist. The underlying physical mechanisms used as the foundation of these concepts resort to an even smaller number of generic physical mechanisms. A characteristics of most existing optical devices is that they are based either on the linear properties of geometrical optics, polarization or crystal optics or on the non-linear optical properties, due to material interaction. Only a few optical devices make use of the properties of singular optics.

SUMMARY OF THE INVENTION

In view of the disadvantages and limits inherent in the known types of optical devices now present in the prior systems, certain embodiments of the present invention provide new optical devices based on internal conical refraction construction wherein the same can be utilized for improving existing methods and applications and/or developing new optical systems, set-ups, methods and applications based on the specific properties of internal conical diffraction.

In these respects, the optical devices based on internal conical refraction according to certain embodiments of the present invention substantially depart from the conventional concepts and designs and in so doing provides an apparatus primarily developed for the purpose of developing new optical devices based on the specific properties of internal conical diffraction.

To attain this, certain embodiments of the present invention generally comprise biaxial crystals, and one or more polarization elements and optical elements. The biaxial crystal is an optical crystal which may, for example, belong to the trigonal, orthorhombic or monoclinic crystal classes. Suitable biaxial crystals include, for example, KTP, KTA, LBO, MDT, YCOB, LiInS$_2$, and LiInSe2 or organic biaxial crystals as POM or NPP. The polarization elements may be any optical elements able to modify or tailor the polarization of an incoming or outgoing beam. The optical elements may be any optical elements able to modify or tailor the spatial or temporal light distribution of an incoming or outgoing beam.

Once aspect of the present invention is to provide optical devices based on internal conical refraction that will overcome the shortcomings of the conventional devices and provide new optical function using specificities of the behavior of light in internal conical diffraction set-ups.

Another aspect is to provide a classical Poggendorff optical set-up, and to build additional functionalities and methods based on this set-up. Another aspect is to provide an optical set-up, referred to as the vortex conical diffraction set-up, and to build additional functionalities and methods based on this set-up. Another aspect is to provide a new optical set-up, referred to as the radial polarization conical diffraction set-up, and to build new functionalities and methods based on this set up. Another aspect is to provide an optical set-up, referred to as the reconstruction conical diffraction set-up, and to build new functionalities and methods based on this set up.

Embodiments of this invention include both Conical Vortex Imaging (CVI), and Polarization Conical Imaging (PCI). CVI is a technique in which the coherent, or partially coherent, incoming light is passing through a vortex conical diffraction set-up. CVI provides contrast enhancement, optical field derivation, phase object imaging, sub-Rayleigh resolution and frequency doubling. PCI—Polarization Conical Imaging works in coherent, partially coherent or fully incoherent light. PCI is a technique in which the coherent or incoherent, incoming light is passing through a vortex conical diffraction set-up in which the circular analyzer is replaced by a linear polarization beamsplitter. PCI provides contrast enhancement, one-dimensional optical derivation, phase object imaging and sub-Rayleigh resolution.

Both CVI and PCI provide an Optical Superresolution Technique (OST). Both CVI and PCI provide a method to optically modify an incoming light distribution, originating from an object and to modify the incoming light distribution to create an outcoming light distribution. The subsequent light distribution when recorded on a light detector, single, dual or quad, and processed numerically provides additional information or additional precision for given information, on the object.

An additional embodiment may provide for overlay metrology, i.e. measuring accurately the position of a fiducial mark on several layers, in order to measure the relative position of the layers.

Another aspect of this invention is to provide solutions for optical storage based on optical devices based on conical diffraction. An additional embodiment may provide for the detection, measurement or qualification of small particles in a scene or, small marks or defects on a wafer or object. An additional embodiment may provide for an optical storage and to the ability to recognize the presence and/or the position of pits or lands on a disk, with higher resolution.

An additional embodiment may allow reading an optical disk with a lens of lower numerical aperture. An additional embodiment is to provide a solution to the convergence between the Blu Ray and HD-DVD standards by providing a simpler reader able to read both standards due to the capacity to reduce the Numerical Aperture of the optical lenses.

Another aspect is to provide new optical set-ups, methods, devices and applications to homogenize a light distribution. Another aspect is to provide a set-up for creating chromatic and achromatic optical vortices and doughnut shaped beams and arrays of them. Another aspect is to provide achromatic optical devices and optical applications based on internal conical refraction. Another embodiment is to provide a new set-up to measure accurately, in two dimensions, an angle. Another embodiment is to provide a coding/decoding scheme to process a light distribution.

According to one embodiment of the invention there is provided an optical device. The optical device comprises: a circular polarizer arranged to provide a first circular polarization; a biaxial crystal disposed after the circular polarizer; and a circular analyzer disposed after the biaxial crystal, the circular analyzer arranged to provide a second circular polarization of an opposite handedness to the first polarization, wherein a geometrical axis traverses through the circular polarizer, the biaxial crystal and the circular analyzer, wherein an optic axis of the biaxial crystal is along the geometrical axis. The optical device may be part of a system where the optical system comprises: a projection lens arranged to receive light from an object to be viewed; an imaging lens arranged to receive light from the projection lens; an optical detector arranged to receive light imaged by the imaging lens; and the optical device arranged between the imaging lens and the optical detector.

According to another embodiment of the invention there is provided an apparatus The apparatus comprises: a first polarizing beamsplitter; a first quarter wave plate disposed after the first polarizing beamsplitter; a biaxial crystal disposed after the first quarter wave plate; a second quarter wave plate disposed after the biaxial crystal; and a second polarizing beamsplitter disposed after the second quarter wave plate and arranged to function as a beam splitter and beam combiner; wherein a geometrical axis traverses through the first quarter wave plate, the biaxial crystal and the second quarter waveplate, wherein an optic axis of the biaxial crystal is along the geometrical axis. According to this embodiment the apparatus may further comprise: a waveplate or rotator element arranged after the second quarter waveplate.

According to another embodiment of the invention there is provided an optical device. The optical device comprises: a biaxial crystal; and a polarizing beamsplitter disposed after the biaxial crystal, wherein a geometrical axis traverses the biaxial crystal and the beamsplitter, wherein an optic axis of the biaxial crystal is along the geometrical axis.

The optical device may be part of a system where the optical system comprises a projection lens arranged to receive light from an object to be viewed; an imaging lens arranged to receive light from the projection lens; two optical detectors, one for each channel of the beamsplitter, arranged to receive light imaged by the imaging lens; and the optical device arranged between the imaging lens and the optical detector.

According to another embodiment of the invention there is provided an optical device. The optical device comprises: a first polarization element arranged to provide a first polarization; a biaxial crystal disposed after the first polarization element; and a second polarization element disposed after the biaxial crystal, the second polarization element arranged to provide a second polarization, wherein a geometrical axis traverses through the first polarization element, the biaxial crystal and the second polarization element, wherein an optic axis of the biaxial crystal is along the geometrical axis.

According to another embodiment of the invention there is provided an optical system. The optical system comprises: an imaging module arranged to provide light to a spot on an optical disk, and to direct light reflected from the spot; a circular polarizer arranged to receive light reflected from the spot and directed to the circular polarizer; a biaxial crystal disposed after the circular polarizer; a circular analyzer disposed after the biaxial crystal, the circular analyzer arranged to provide a circular polarization of an opposite handedness to that provided by the circular polarizer; and a light detector arranged after the circular analyzer to detect the light received from the circular analyzer, wherein a geometrical axis traverses through the circular polarizer, the biaxial crystal and the circular analyzer, wherein an optic axis of the biaxial crystal is along the geometrical axis. The imaging module may comprise: a light source which provides light; a beam splitter arranged to receive light from the light source; and focusing optics arranged to focus light from the beam splitter to the spot and to receive light reflected from the spot and direct the light received from the spot to the beam splitter.

According to another embodiment of the invention there is provided an optical device, the optical device comprising: a beamsplitter arranged to separate received light into two optical channels with different polarization characteristics; a biaxial crystal, wherein a geometrical axis traverses the biaxial crystal and the beamsplitter, wherein an optic axis of the biaxial crystal is along the geometrical axis; and a pixelated light detector. According to this embodiment the optical device may further comprise: a controllable waveplate with at least two different polarization states.

According to another embodiment of the invention there is provided an optical system. The optical system comprises: an imaging module arranged to provide light to a spot on an optical disk, and to direct light reflected from the spot; a circular polarizing beamsplitter arranged to receive light reflected from the spot and directed to the circular polarizer; a biaxial crystal disposed after the circular polarizer; a circular analyzer disposed after the biaxial crystal, the circular analyzer arranged to provide a circular polarization of an opposite handedness to that provided by the circular polarizing beamsplitter; and a light detector arranged after the circular analyzer to detect the light received from the circular analyzer, wherein a geometrical axis traverses through the circular polarizing beamsplitter, the biaxial crystal and the circular analyzer, wherein an optic axis of the biaxial crystal is along the geometrical axis, wherein the light detector comprises two separate detector modules used concurrently.

According to another embodiment of the invention there is provided a method. The method comprises: providing a biaxial crystal; inputting partially coherent light with an input light circular polarization from an unknown object through the biaxial crystal; providing a circular analyzer after the biaxial crystal, the circular analyzer arranged to provide a second circular polarization of an opposite handedness to the handedness of the input light circular polarization, wherein a geometrical axis traverses through the biaxial crystal and the circular analyzer, wherein an optic axis of the biaxial crystal is along the geometrical axis, wherein the initial light distribution has been imaged by an optical system onto a detector, wherein, if the biaxial crystal were replaced by an isotropic material with an index equal to about the biaxial crystal median index, the image would fall on the detector, before inputting in the biaxial crystal; detecting the distribution of intensity of the light in a plane after the circular analyzer with the detector, wherein the plane is perpendicular to the geometrical axis; imaging features of the unknown object from the detected distribution of intensity; and outputting the imaged features of the unknown object.

According to this embodiment the method may further comprise recording the imaged features of the unknown object.

According to this embodiment the detected distribution of intensity of the light is proportional to the derivative of the initial light distribution.

According to this embodiment the step of detecting the distribution of intensity comprises: providing a second biaxial crystal after the circular analyzer along the geometrical axis; providing a rotator after the second biaxial crystal along the geometrical axis; providing a third biaxial crystal after the rotator along the geometrical axis; and detecting the distribution of the intensity of light in plane after the third biaxial crystal with the detector.

According to another embodiment of the invention there is provided a method. The method comprises: providing a circular polarizer arranged to provide a first circular polarization on incident light; providing a biaxial crystal after the circular polarizer; inputting unpolarized, partially coherent light from an unknown object through the circular polarizer and the biaxial crystal; providing a circular analyzer after the biaxial crystal, the circular analyzer arranged to provide a second circular polarization of an opposite handedness to the first polarization, wherein a geometrical axis traverses through the circular polarizer, the biaxial crystal and the circular analyzer, wherein an optic axis of the biaxial crystal is along the geometrical axis, wherein the unpolarized, partially coherent light has been imaged on the circular polarizer, wherein the initial light distribution has been imaged by an optical system onto a detector, wherein, if the biaxial crystal were replaced by an isotropic material with an index equal to about the biaxial crystal median index, the image would fall on the detector, before inputting in the biaxial crystal; detecting the distribution of intensity of the light in a plane after the circular analyzer with the detector; wherein the plane is perpendicular to the geometrical axis; imaging features of the unknown object from the detected distribution of intensity; and outputting the imaged features of the unknown object.

According to this embodiment, the object may be made of an array of dense lines and the lines frequency is doubled in the outputted light distribution.

According to this embodiment the incident light may be provided from an assembly of points.

According to this embodiment the incident light may consist of a plurality of wavelengths.

According to this embodiment the object may be a fiducial mark, and data retrieved based on the light received by the detector provides the position of the fiducial mark.

According to this embodiment, the method may further comprise: determining the type of features based on its transfer function through the circular polarizer, the biaxial crystal and the circular analyzer; segmenting the distribution of intensity into regions containing a single type of feature; calculating the centers of peaks of the detected distribution of intensity of light as a location in the plane for each type of feature; and outputting the locations in the plane as the locations of the features in the plane, for each type of feature. According to this embodiment, the method may further comprise: counting the total number of features per unit area for each type of feature.

According to this embodiment the method may further comprise: recording the imaged features of the unknown object.

According to this embodiment the detected distribution of intensity of the light may be proportional to the derivative of the initial light distribution.

According to this embodiment the incident light may be provided from an assembly of points, wherein the imaging comprises projecting the intensity of light in a volume after the circular analyzer, wherein the volume is perpendicular to the geometrical axis, and the method, further comprising: using the intensity of the light to trap particles using optical trapping concepts.

According to this embodiment the incident light may comprise a plurality of wavelengths is provided from an assembly of points, wherein the imaging comprises projecting the intensity of light in a volume after the circular analyzer, wherein the volume is perpendicular to the geometrical axis, the method, further comprising: using the intensity of the light to trap particles using optical trapping concepts.

According to this embodiment the input unpolarized, partially coherent light may have a direction of propagation at an angle with respect to the geometrical axis, and the method further comprising: calculating the angle from the detected the distribution of intensity of the light.

According to this embodiment the unknown object may be a phase object.

According to this embodiment wherein the unknown object comprises pits and lands on the surface of an optical disk, the method may further comprise: reading information stored in the pits and lands.

According to this embodiment the optical system may projecting and receive the light from the spot on the disk uses a lens with numerical aperture lower then one calculated using Rayleigh criterion.

According to this embodiment the step of detecting the distribution of intensity may comprise: providing a second biaxial crystal after the circular analyzer along the geometrical axis; providing a rotator after the second biaxial crystal along the geometrical axis; providing a third biaxial crystal after the rotator along the geometrical axis; and detecting the distribution of the intensity of light in plane after the third biaxial crystal with the detector.

According to another embodiment of the invention there is provided a method. The method comprising: providing a first polarizing beamsplitter; providing a first quarter wave plate after the first polarizing beamsplitter; providing a biaxial crystal after the first quarter wave plate; providing a second quarter wave plate after the biaxial crystal; providing a second polarizing beamsplitter after the second quarter wave plate, wherein a geometrical axis traverses through the first quarter wave plate, the biaxial crystal and the second quarter waveplate, wherein an optic axis of the biaxial crystal is along the geometrical axis, directing light from a point through the first polarizing beamsplitter, splitting the light into two parallel beams at the first beamsplitter, wherein the two parallel beams traverse the first quarter wave plate, the biaxial crystal, the second quarter wave plate and the second polarizing beamsplitter, combining vortex waves from the two split parallel beams at the second beamsplitter into one beam propagating in a first direction; adding if necessary a wave plate or rotator element to transform azimuthal to radial polarization or vice versa, and combining fundamental waves from the two split parallel beams into another beam propagating in a second direction perpendicular to the first direction that the combined vortex waves are propagating, and using the light coming from the combined vortex waves as an azimuthal or radial polarized illumination source for lasers applications as lithography illumination and/or high power lasers for cutting, drilling and machining or for optical storage applications. According to this embodiment the method may further comprise: providing a waveplate or rotator element; and transforming one of azimuthal and radial polarization of the light beams to the other of azimuthal and radial polarization via the waveplate or rotator element.

According to this embodiment the method may further comprise: performing photolithography with the light from the combined vortex waves to fabricate a device structure on a semiconductor wafer.

According to this embodiment the method may further comprise machining materials with the light from the combined vortex waves.

According to this embodiment the method may further comprise writing information to an optical storage disk with the light from the combined vortex waves.

According to another embodiment of the invention there is provided a method. The method comprising: providing a biaxial crystal; inputting light either unpolarized or circularly polarized from an unknown object through the biaxial crystal; providing a linear polarization beamsplitter after the biaxial crystal, wherein a geometrical axis traverses through the biaxial crystal and is split in two conjugate axes after the polarizing beamsplitter, wherein the optic axis of the biaxial crystal is along the geometrical axis, wherein the initial light distribution has been imaged by an optical system onto a detector, wherein, if the biaxial crystal were replaced by an isotropic material with an index equal to about the biaxial crystal median index, the image would fall on the detector, before inputting in the biaxial crystal; detecting the distribution of intensity of the light in both optical channels emerging from the polarizing beamsplitter in planes perpendicular to the two geometrical axes created by the beamsplitter on the detector; imaging features of the unknown object from mathematical combinations of the detected distribution intensity; and outputting the imaged features of the unknown object. According to this embodiment the detected distribution of light may be proportional to the derivative in one axis of the initial light distribution.

According to this embodiment the object may be a phase object.

According to this embodiment the method the detector may comprise two regions, wherein the light emerging from one of the optical channels is incident on one of the regions of the detector and the light emerging from the other optical channel is incident on the other region of the detector.

According to this embodiment the method the detector may comprise two detectors, wherein the light emerging from each optical channel is incident on each detector.

According to this embodiment the method may comprise recording the output, imaged features of the unknown object.

According to this embodiment the method the unknown object may be a measurement mark, the method further comprising: calculating the position of the measurement mark from the mathematical calculations of the detected distribution of intensity.

According to this embodiment the method the unknown object may comprise pits and lands on the surface of an optical disk, the method further comprising: reading information stored in the pits and lands.

According to this embodiment the optical system projecting and receiving the light from the spot on the disk may use a lens with numerical aperture lower then one calculated using Rayleigh criterion.

According to another embodiment of the invention there is provided a method. The method comprising: providing a biaxial crystal; inputting light either unpolarized or circularly polarized from an unknown object through the biaxial crystal; providing a linear polarization beamsplitter after the biaxial crystal, wherein a geometrical axis traverses through the biaxial crystal and is split in two conjugate axes after the polarizing beam splitter, wherein the optic axis of the biaxial crystal is along the geometrical axis, wherein the initial light distribution has been imaged by an optical system onto a detector, wherein, if the biaxial crystal were replaced by an isotropic material with an index equal to about the biaxial crystal median index, the image would fall on the detector, before inputting in the biaxial crystal; detecting the distribution of intensity of the light in both optical channels emerging from the polarizing beamsplitter in planes perpendicular to the two geometrical axes created by the beamsplitter on the detector; imaging the features of the unknown object; and outputting the features of the unknown object.

According to this embodiment the method the detector may comprise two regions, wherein the light emerging from one of the optical channels is incident on one of the regions of the detector and the light emerging from the other optical channel is incident on the other region of the detector.

According to this embodiment the method the detector may comprise two detectors, wherein the light emerging from each optical channel is incident on each detector.

According to this embodiment the method may further comprise recording the output, imaged features of the unknown object.

According to this embodiment the method the detected distribution of light may be proportional to the derivative in one axis of the initial light distribution.

According to this embodiment the method the unknown object comprises pits and lands on the surface of an optical disk, the method further comprising: reading information stored in the pits and lands.

According to this embodiment the method the step of detecting the distribution of intensity may comprise: providing a second biaxial crystal after the circular analyzer along the geometrical axis; providing a rotator after the second biaxial crystal along the geometrical axis; providing a third biaxial crystal after the rotator along the geometrical axis; and detecting the distribution of the intensity of light in plane after the third biaxial crystal with the detector.

According to another embodiment of the invention there is provided a method. The method comprises: providing a biaxial crystal; inputting light either unpolarized or circularly polarized from an unknown object through the biaxial crystal; providing a linear polarizer and a controllable rotator after the biaxial crystal, wherein a geometrical axis traverses through the biaxial crystal, the polarizer and the controllable rotator wherein the optic axis of the biaxial crystal is along the geometrical axis, wherein the initial light distribution has been imaged by an optical system onto a detector, wherein, if the biaxial crystal were replaced by an isotropic material with an index equal to about the biaxial crystal median index, the image would fall on the detector, before inputting in the biaxial crystal; detecting the distribution of intensity of the light in two or more polarization states by actuating the controllable rotator in a plane perpendicular to the geometrical axis; imaging features of the unknown object from mathematical combinations of the detected distribution of intensity; and outputting the imaged features of the unknown object.

According to this embodiment the detected distribution of light may be proportional to the derivative in one axis of the initial light distribution.

According to this embodiment the unknown object may be a measurement mark, the method further comprising: calculating the position of the measurement mark based on the detected distribution of intensity.

According to this embodiment the object may be a phase object.

According to this embodiment the method may further comprise: splitting the input light into two input channels with inverted circular polarization, either sequentially or spatially. According to this embodiment the detector may comprise four regions, wherein the light emerging from each one of the combination of input and output channels is incident on one of the regions of the detector.

According to this embodiment the detector may comprises only two regions, wherein the light emerging from each two of the combinations of input and output channels are incident concurrently on the two regions of the detector and the two other combinations are recorded sequentially to the two first ones.

According to this embodiment the detector may comprise a single region and all four combinations of input and output channels are recorded sequentially.

According to this embodiment may further comprise recording the output, imaged features of the unknown object.

According to this embodiment the unknown object may be a measurement mark, the method further comprising: calculating the position of the measurement mark based on the detected distribution of intensity.

According to this embodiment the detected distribution of light may be proportional to the derivative in one axis of the initial light distribution.

According to this embodiment the object may be a phase object.

According to this embodiment the method may further comprise: recording the imaged features of the unknown object.

According to this embodiment the method the detected distribution of light may be proportional to the derivative in one axis of the initial light distribution.

According to this embodiment the method the unknown object comprises pits and lands on the surface of an optical disk, the method further comprising: reading information stored in the pits and lands.

According to this embodiment the optical system projecting and receiving the light from the spot on the disk may use a lens with numerical aperture lower then one calculated using Rayleigh criterion.

According to another embodiment of the invention there is provided a method for angular measurement, comprising: providing a circular polarizer arranged to provide a first circular polarization; providing a biaxial crystal after the circular polarizer; providing a circular analyzer after the biaxial crystal, the circular analyzer arranged to provide a second circular polarization of an opposite handedness to the first polarization, wherein a geometrical axis traverses through the circular polarizer, the biaxial crystal and the circular analyzer, wherein an optic axis of the biaxial crystal is along the geometrical axis, directing light from a point, or a series of points, through the circular polarizer, the biaxial crystal and the circular analyzer, wherein the central axis of the light distribution of the point or of the series of points, may be partially misaligned relative to the geometrical axis; detecting the distribution of intensity of the light in a plane after the circular analyzer, wherein the plane is perpendicular to the geometrical axis; calculating the departure from the ring structure due to misalignment of the optical axis for the point or for each point of the series of points separately; and outputting the measured angular misalignment for the point or for each point of the series of points separately.

According to this embodiment of the invention the method may further comprise: rigidly attaching a light point to an object with a predetermined angular relation between the object and the axis of the light point; and assessing the tilt and yaw of the object at the point to which the light point had been attached; and assessing the lateral position of the point by calculating the centroid of the light distribution.

According to another embodiment of the invention there is provided a method comprising: providing a biaxial crystal after the circular polarizer; providing a circular analyzer after the biaxial crystal, the circular analyzer arranged to provide a second circular polarization of an opposite handedness to the first polarization, wherein a geometrical axis traverses through the circular polarizer, the biaxial crystal and the circular analyzer, wherein an optic axis of the biaxial crystal is along the geometrical axis, directing light from a linearly polarized point, or a series of points, through the circular polarizer, the biaxial crystal and the circular analyzer, wherein the linear polarization of the light point or of the series of light points is rotated relative to the vertical axis; detecting the distribution of intensity of the light in a plane after the circular analyzer, wherein the plane is perpendicular to the geometrical axis; calculating the angle of the ring segment due to departure from the vertical axis of the linear polarization for the point or for each point of the series; and outputting the measured angle for the point or for each point of the series of points separately.

According to this embodiment of the invention the method may further comprise: rigidly attaching a light point with linear polarization to an object with a predetermined angular relation between the object and the axis of the light point.

According to another embodiment of the invention there is provided an optical system comprising: an imaging module arranged to provide light to a spot on an optical disk, and to direct light from the spot; the imaging module further comprising: a light source; a polarizing beamsplitter; and focusing and aligning optics arranged to focus light from the light source on the disk and tracking a specific track on the disk and to receive light reflected from the spot and direct the light received from the spot to the polarizing beamsplitter; a first quarter wave plate arranged to receive light reflected from the spot and directed to the polarizing beamsplitter; a biaxial crystal disposed after the quarter wave plate; a second quarter wave plate disposed after the biaxial crystal, the circular analyzer arranged to provide a circular polarization of an opposite handedness to that provided by the first quarter wave plate; and a light detector arranged after the second quarter wave plate to detect light received from the second quarter wave plate, wherein a geometrical axis traverses through the first quarter wave plate, the biaxial crystal and the second quarter wave plate, wherein the optic axis of the biaxial crystal is along the geometrical axis.

According to this embodiment of the invention the light detector may comprise one of a single light detector, a segmented light detector, or a light detector comprised of a matrix of elements.

According to another embodiment of the invention there is provided an optical system comprising: an imaging module arranged to provide light to a spot on an optical disk, and to direct light reflected from the spot; a quarter wave plate; a first polarizing beamsplitter arranged to receive light reflected from the spot and directed to the quarter wave plate; a biaxial crystal disposed after the quarter wave plate; a second polarizing beamsplitter disposed after the biaxial crystal, the second polarizing beamsplitter arranged to provide both linear orthogonal polarizations in two channels; and two light detectors arranged after the second polarizing beamsplitter to detect the light received in both channels of the second polarizing beamsplitter, wherein a geometrical axis traverses through the first polarizing beamsplitter, the quarter wave plate, the biaxial crystal and the second polarizing beamsplitter, wherein an optic axis of the biaxial crystal is along the geometrical axis, wherein the light detector comprises two separate detector modules used concurrently.

According to this embodiment of the invention the imaging module may further comprise: a light source; the first polarizing beamsplitter; and focusing and aligning optics arranged to focus light from the light source on the disk and tracking a specific track on the disk and to receive light reflected from the spot and direct the light received from the spot to the first polarizing beamsplitter.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

Various other objects, features and attendant advantages of the present invention will become fully appreciated as the same becomes better understood when considered in conjunction with the accompanying drawings, in which like reference characters designate the same or similar parts throughout the several views, and wherein:

BRIEF DESCRIPTION OF THE DRAWINGS

FIG. 2 illustrates internal conical diffraction cone and cone centered geometry for a biaxial crystal.

FIG. 3 illustrates graphs showing the amplitude and intensity of the fundamental and vortex waves for Poggendorff rings of an imaged point in (a), (b) and (c).

FIG. 8 depicts in view (a) the three-dimensional representation of the intensity from two points in a plane perpendicular to the geometrical axis, in view (b) a grey-scale representation of the intensity from two points in the plane and in view (c) isointensity patterns for one point, two points separated by the diffraction limit (DL) and two points separated by 0.75 of the diffraction limit (0.75 DL).

FIG. 14 (a)-(f) illustrates an improvement in resolution for PCI.

DETAILED DESCRIPTION OF THE PREFERRED EMBODIMENTS

Figure 1:
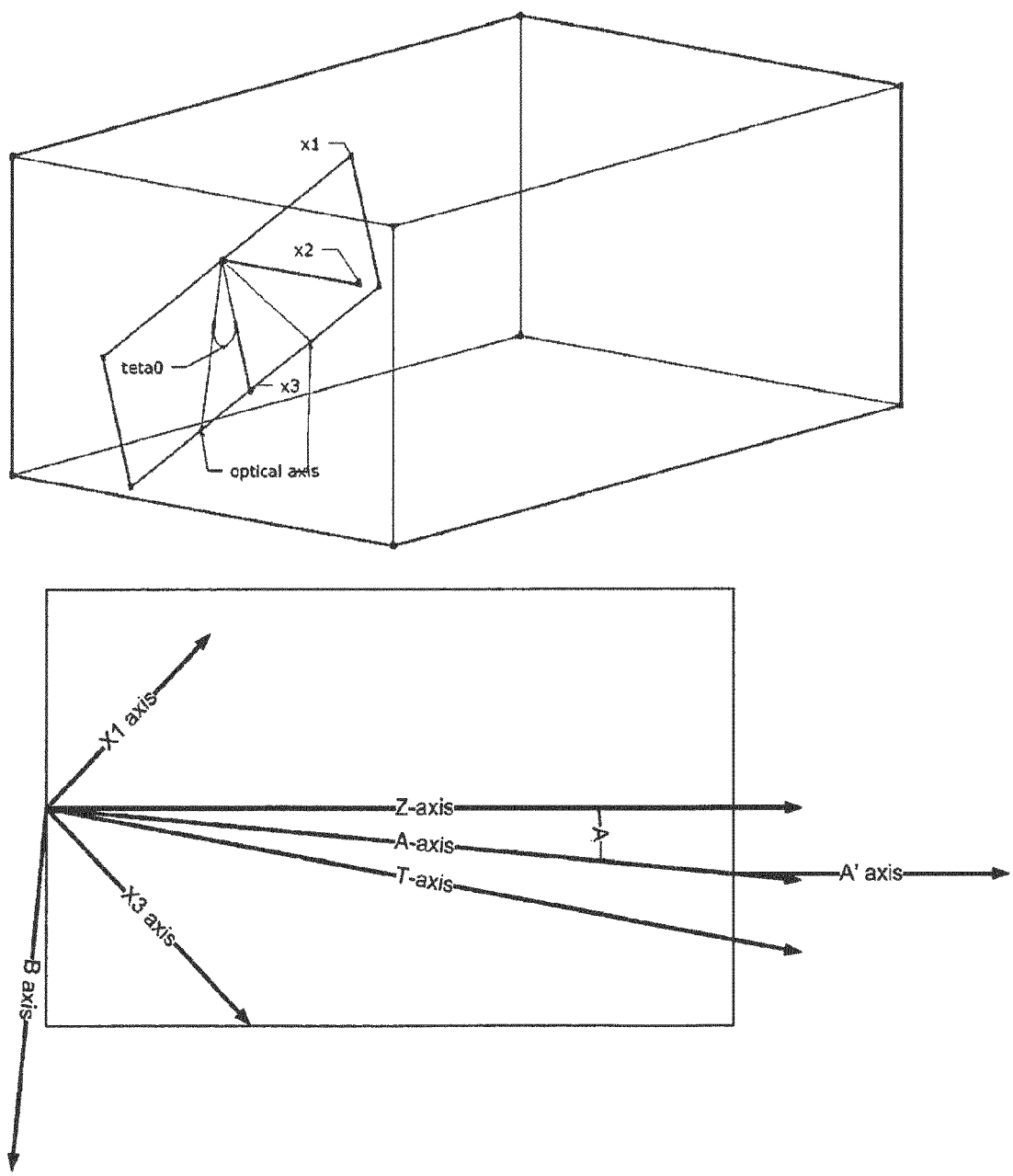
FIG. 1 is a diagram describing biaxial crystals definitions, where (a) describes optical frame and optical axes; (b) describes additional axes definitions.

The concepts of the present invention have several applications, which include for examples, as follows. The optical devices described in the following are able to perform several different functionalities, classified in this document as imaging, optical storage, light and illumination shaping, achromatic optical vortices, polarization doughnuts, angular measurement and coding and reconstruction.

Imaging:

Optical resolution describes the ability of a system to distinguish, detect, and/or record physical details by electromagnetic means. Several techniques, named superresolution techniques, have been developed to exceed the classical resolution limits of the optical resolution of an imaging system. These techniques make a better use of the existing optical information and provide OST. OST refers to techniques in which an additional optical sub-assembly is used to increase the optical resolution of the final intensity image. The essence of OST is based on a modification of the characteristics of the light transfer function through different optical means.

The improvements carried by the OST can be qualified in most cases as contrast or resolution enhancement. To quantify these improvements, we define the contrast of a target or of a particle, as the ratio of the difference between the minimal and maximal signals and the dynamic range of the detector, in an optimal alignment.

To define resolution improvement, we define three different metrics, depending on the task carried on by the imaging system.

Indeed, the three main functions are performed by imaging systems: measurement and metrology, detection and counting, direct imaging of an optical object.

A measurement system is aimed to detect the exact position, at a given time, of a known feature. The feature may be a star in Astronomy, a fluorescent point in Biology or an AIM structure in Overlay Metrology, for example. The metrics of a measurement system is the feature position precision and can be assessed using the information contents as defined by Seligson for Metrology, defined below. A similar concept, intrinsic imprecision, introduced by Lindegren is used in Astrometry.

A detection (counting) system is directed to detecting the presence of a particle. The particle may be a star in Astronomy, a defect in machine vision or a fluorescent point in Biology. The metrics is the detection probability of a particle depending on its size, shape and contrast A direct imaging system is aimed to transfer to an observer a faithful representation of a general unknown optical object. Several additional metrics exist to quantify optical resolution exist but are overshadowed by the omnipresent Rayleigh criterion The different functions are carried by processing the resulting image using dedicated algorithmic. OST techniques, as the ones described below, are able to improve the metrics of the performances of the tasks. They permit either a better precision in metrology, to detect particles or defects not recognized before, or to get a better image of an object under observation.

Optical Storage:

One application for such optical devices is optical storage. The actual incoming generation in optical storage is based on the integration of blue diode laser technology as a replacement to red diode lasers. With the availability of the first systems to the general public, researchers and industry leaders are beginning their search for the concepts of the next generation of optical storage. Additionally, the current generation had evolved in two competing, incompatible standards, HD-DVD and Blu Ray. To permit to the user to read both standards on the same reader necessitate a very complex and expensive optical system due to the inherent complexity of each one of the standards. The additional resolution of CVI and PCI described below permit the building of an OPU—Optical Processing Unit—with a lower Numerical Aperture and a much lower complexity. This allows the realization of a hybrid OPU, able to read both HD-DVD and Blu Ray at a reasonable cost.

Achromatic Optical Vortices:

The applications of monochromatic and achromatic vortices include but are not limited to Astronomy and optical trapping.

Polarized Doughnuts:

The generation of a radially polarized doughnut light distribution, using different set-ups, has been described in the context of small spot generation and for lithographic illumination. Additionally, several other functionalities necessary in some illumination systems, are provided by this invention. The light is homogenized and hot spots have to be removed. An annular pattern is created. Additionally the coherence state of the light is controlled.

Angular Measurement:

The capacity to assess, in the optical domain, the angle of the axis of a centrosymmetric light distribution opens the way to several practical devices. Today the main solution used is Fabry-Perot based devices, but these devices suffer from a strong wavelength and temperature dependence.

Coding and Reconstruction:

The ability to code the light as a singular light distribution and to reconstruct in a clear analogy to Fourier Transform processing allows several optical processing tasks to be performed on an incoming light distribution.

Turning now descriptively to the drawings, in which similar reference characters denote similar elements throughout the several views, the attached figures illustrate optical devices based on internal conical refraction, which comprises biaxial crystal(s), one or more polarization elements and optical elements.

The biaxial crystal is an optical crystal which may belong to the trigonal, orthorhombic or trigonal crystal classes.

The polarization elements may be any optical elements able to modify the polarization of an incoming beam. The polarization elements may include polarizing beamsplitters, polarizers, waveplates, rotators, or any other polarization element known to the skilled professional.

The optical elements may be any optical elements able to modify the spatial or temporal light distribution of an incoming beam. The optical elements may include lens, mirrors, prisms, HOE—Holographic Optical Elements—or grating able to fulfill the spatial and angular shaping of the input light at the input plane of the conical set-up or the shaping of the output light from the output plane of the conical diffraction set-up.

FIGS. 1(*a*) and 1(*b*) depict biaxial crystals. FIG. 1(*a*) defines the optical frame and FIG. 1(*b*) defines the optical axes of a biaxial crystal. The optical frame represents the principal axes of the index ellipsoid, $x_1$, $x_2$ and $x_3$, of the biaxial crystal. The three principal dielectric constants $\in_i$ and three refractive indices $n_i$, satisfy:

$$\in_1 = n_1^2 < \in_2 = n_2^2 < \in_3 = n_3^2, \tag{1}$$

where $n_2$ is the median index. It is used along the following developments as a measure of the equivalent isotropic diffraction of the crystal. Additionally we define, $\theta_0$ the angle of the optical axis relative to the z axis, A as the semi-angle of the cone, $R_0$ as the radius of the emerging rings, l as the crystal length and w as the width of incident beam. We define also the normalized width p as the ratio $w/R_0$. k represents the wavevector in the material, $(2\pi/n_2\lambda)$.

We define, in FIG. 1(*b*), a Cartesian reference frame with its z-axis parallel to the optical axis, its y-axis parallel to the $x_2$ optical frame axis, and its x-axis perpendicular to both. We define additionally in the crystal, three axes, the T-axis, the A-axis and the B-axis; outside the crystal we define the A'-axis.

FIG. 2 illustrates the internal conical diffraction cone and cone centered geometry. The crystal is positioned with its entrance face at z=0; the geometrical axis of the system, referred as z, is in the direction of one of the optical axis, as described previously. We will refer in short to this set-up as a conical diffraction set-up. The coordinates used are transverse cone-centered coordinates [x, y, z]=[R,z], ad-hoc coordinate, introduced by Berry, defined to simplify the solution of the equations of conical diffraction. The reference axis is the A-axis—and not the optical axis—inside the crystal. Outside the crystal the reference axis is the A'-axis.

FIG. 3(*a-c*) show simulations of the amplitude and intensity of the fundamental and vortex waves for Poggendorff rings of an imaged point. FIG. 3(*a*) presents the profile of the amplitude. FIG. 3(*b*) illustrates the intensity, for $B_0$, the fundamental wave function or $B_1$, the vortex wave function; both functions have been defined by Berry. In FIG. 3(*c*), a two-dimensional distribution of the intensity of $B_0$ or $B_1$ is depicted.

Figure 4:
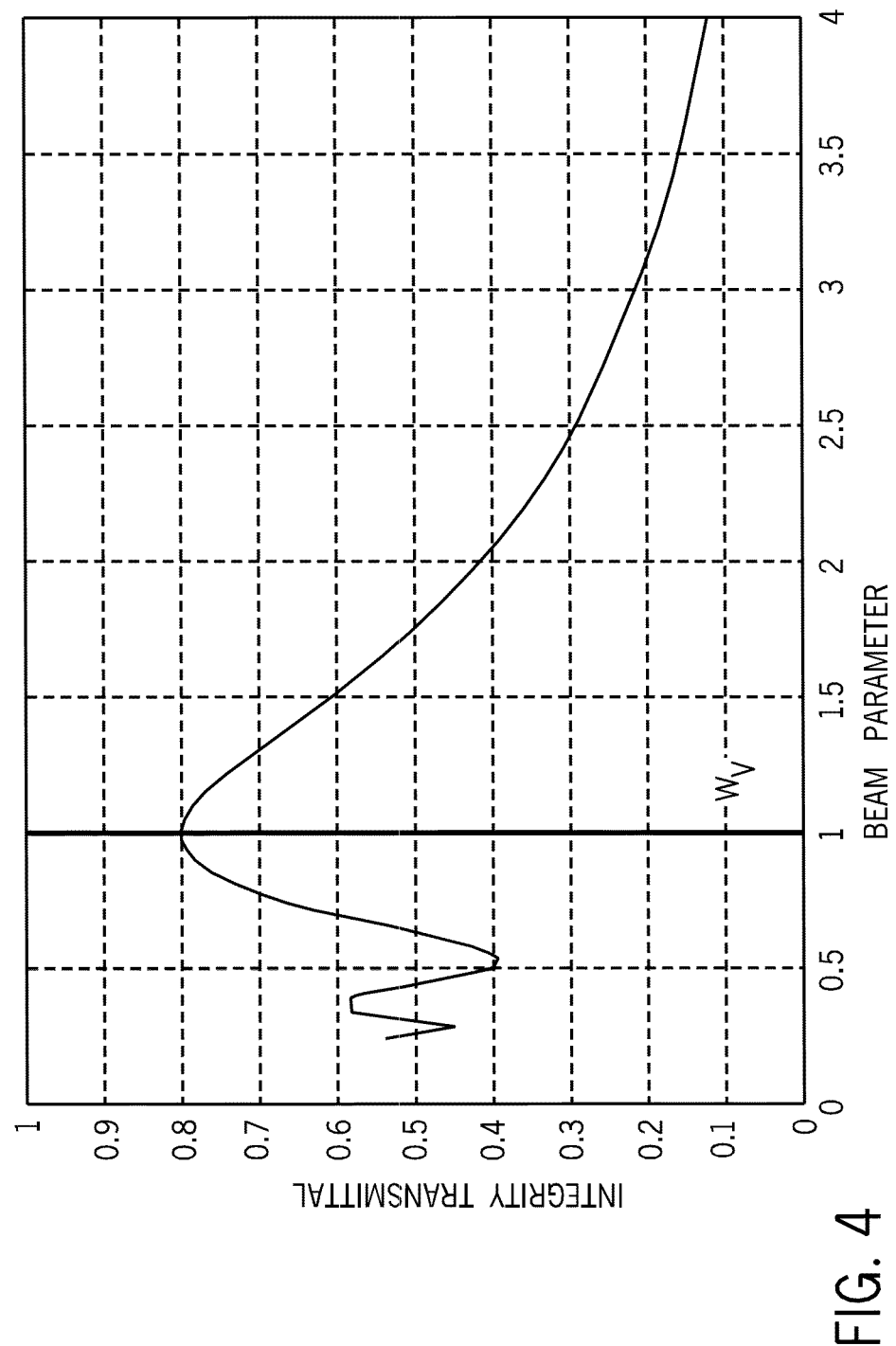
FIG. 4 is a graph illustrating the Intensity transmittance for an imaged point in a conical vortex set-up as function of the beam parameter.

FIG. 4 represents simulations of the intensity transmittance for an imaged point in a conical vortex set-up as function of the beam parameter, w; the beam parameter is normalized to $p_v$, the vortex spot dimension of the set-up. FIG. 4 represents, for small $p_0$, the amplitude and intensity of the fundamental and vortex waves for an imaged point. Most of the energy is transferred to the vortex wave. For an imaged point in the image plane, for $p_v$, 80% of the incident energy is present in the vortex wave. For a Gaussian beam in the image plane,— for $p_v$, 64% of the incident energy is present in the vortex wave.

Figure 5:
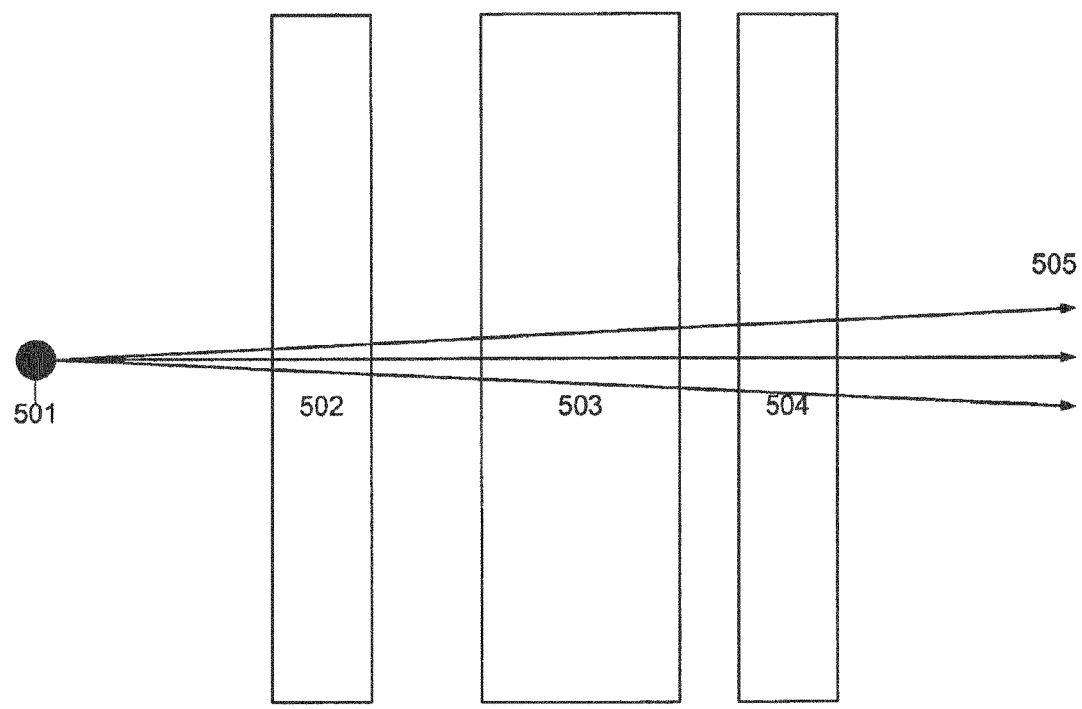
FIG. 5 is a schematic illustrating an optical device according to a CVI device which is a conical vortex set-up with a circular polarizer and a biaxial crystal cut along one of the optical axes according to an embodiment of the invention.

FIG. 5 illustrates a conical vortex set-up. In an embodiment, the incoming light 501 is circularly polarized, either naturally or by a suitable polarizer, such as by the illustrated circular polarizer 502. It comprises, at least, a biaxial crystal 503 cut along one of the optical axes and a circular analyzer 504 with handedness orthogonal to the handedness of the incoming light distribution. It may comprise additional polarization and optical elements able to tailor the incoming and outgoing light distribution in a suitable way. The conical vortex set-up permits only the vortex wave 505 created by an incoming wave. It includes an input circular polarizer—if the light is not naturally polarized, a biaxial crystal cut along one of the optical axes and a circular analyzer with inverse handedness to the input polarizer. The spot dimension for which the energy transmission is maximal, $w_v$, is the natural spot dimension of the set-up.

Figure 6:
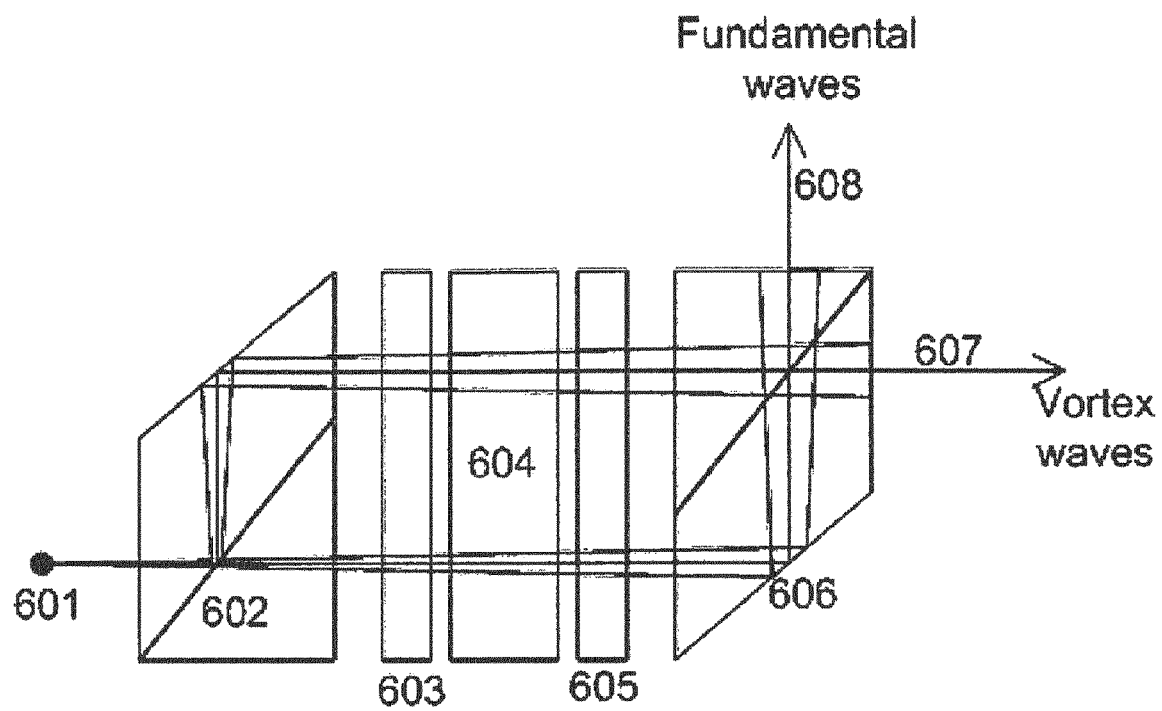
FIG. 6 is a schematic illustrating an optical device according to a PCI device which is a modified conical vortex set-up according to an embodiment of the invention.

FIG. 6 depicts a radially polarized doughnut vortex set-up to create doughnut shaped light distribution. A set-up, bearing many similarities to the set-up used for an optical isolator is presented in FIG. 6. The complete set-up maybe integrated as a monolithic compound module. A light source, not represented in the figure, creates a point with a given spot size. A first polarization separator separates the light in two beams.

The two beams are spatially separated, with orthogonal linear polarizations. The separator 602 may use either a crystalline design—as a Wollaston or Rochon prism, or a polarization beamsplitters, based on thin film technologies as presented in the figure. The separator 602 may be arranged to separate received light into two optical channels with different polarization characteristics. A quarter wave plate 603 transforms the two beams with orthogonal linear polarizations into two beams with circular polarization with inverse handedness. The plate 603 may be a static waveplate, or may be a controllable waveplate with at least two different polarization states. A biaxial crystal 604 creates fundamental and vortex waves from each one of the two beams. A second quarter wave plate 605 transforms back the two couples of beams from circular polarizations to orthogonal polarizations. A second polarization separator 606, used as a combiner, combines separately the two vortex waves and the two fundamental waves into two spatially separated waves. Fine adjustment of the relative optical path length can be provided by a controlled translation of one of the polarization separators. The combination of the vortex wave 607 created by the right handed circular polarization with the vortex wave 607 created by the left handed circular polarization creates a doughnut shaped, radially polarized wave. There is also the resulting fundamental wave 608.

The generation of a radially polarized doughnut light distribution, using different set-ups, has been described in the context of small spot generation and for lithographic illumination. The Poggendorff rings have already a radial varying polarization; however, this polarization dependence is of order ½, i.e. the polarization of the light at two points opposite, geometrically, one to the other are orthogonal. Most of the systems described in the literature require a polarization variation of order 1, i.e., the polarization at two opposite points will be parallel, with opposite phase.

Figure 7:
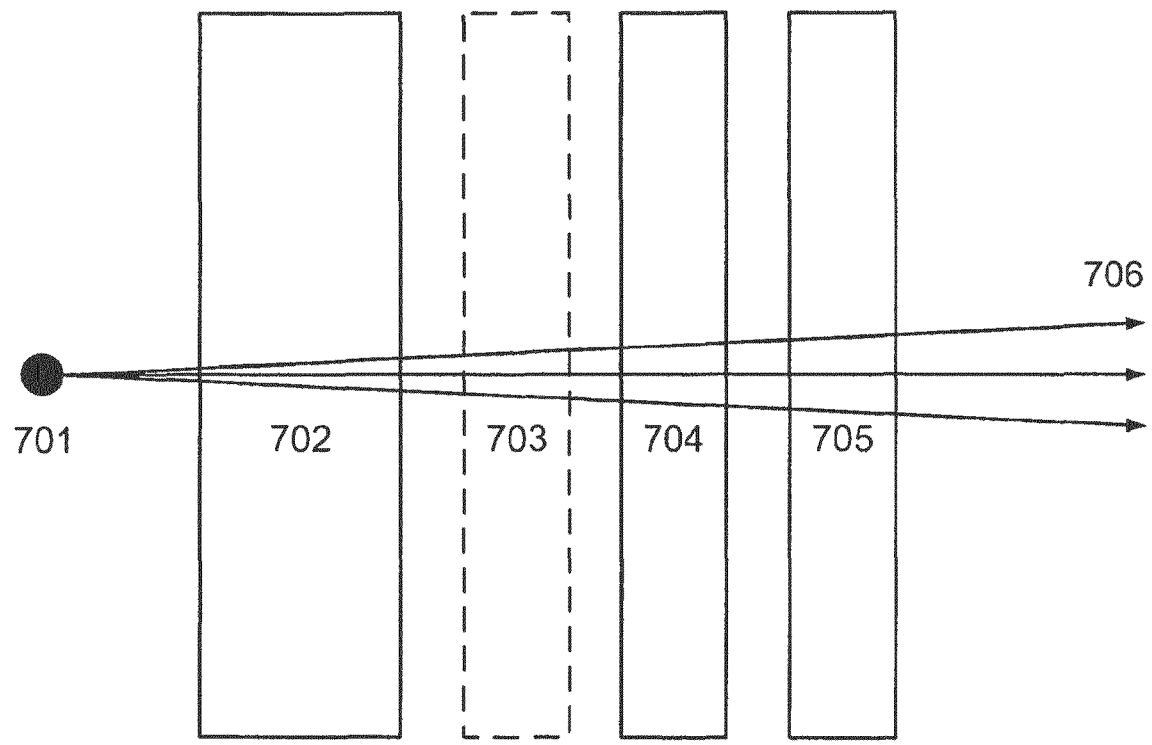
FIG. 7 is a schematic illustrating an optical device according to a reconstruction set-up.

FIG. 7 depicts a reconstruction set-up in one configuration, exact reconstruction, there is no prerequisite condition on the incoming light 701. In a second configuration, approximate reconstruction, the incoming light is circularly polarized, either naturally or by a suitable polarizer. The reconstruction set-up may comprise additional polarization and optical elements able to tailor the incoming and outgoing light distribution in a suitable way.

FIG. 8 depicts in view (a) the three-dimensional representation of the intensity from two points in a plane perpendicular to the geometrical axis, in view (b) a grey-scale representation of the intensity from two points in the plane and in view (c) isointensity patterns for one point, two points separated by the diffraction limit (DL) and two points separated by 0.75 of the diffraction limit (0.75 DL).

Figure 9:
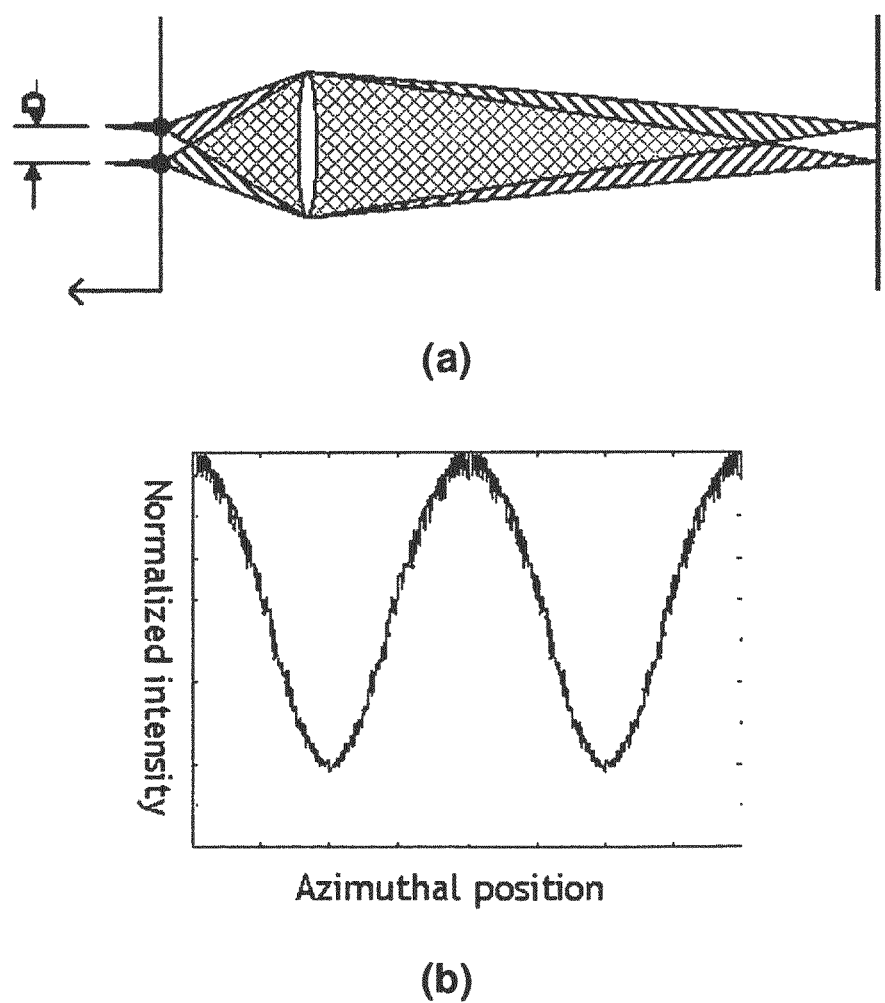
FIG. 9 depicts the two point's resolution in CVI.
Figure 9C:
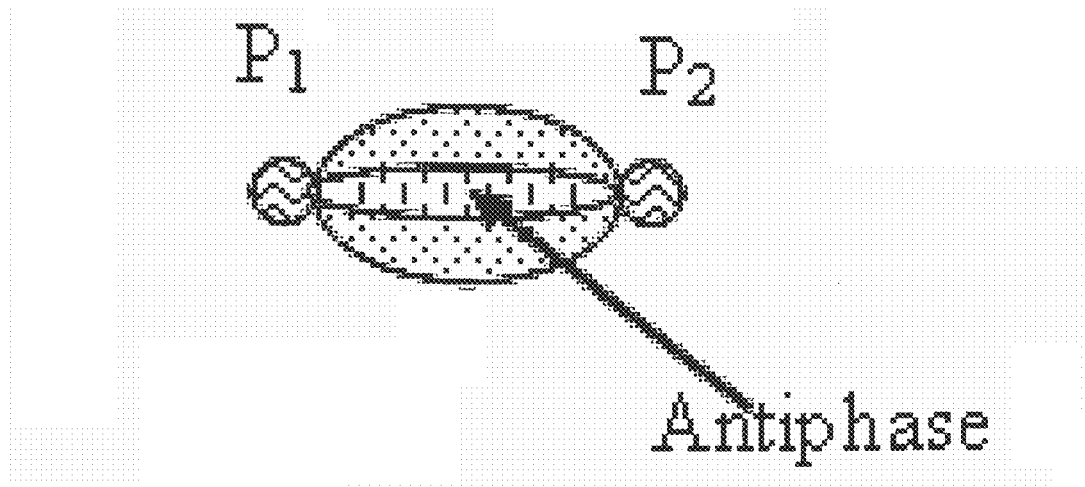
Figure 9D:
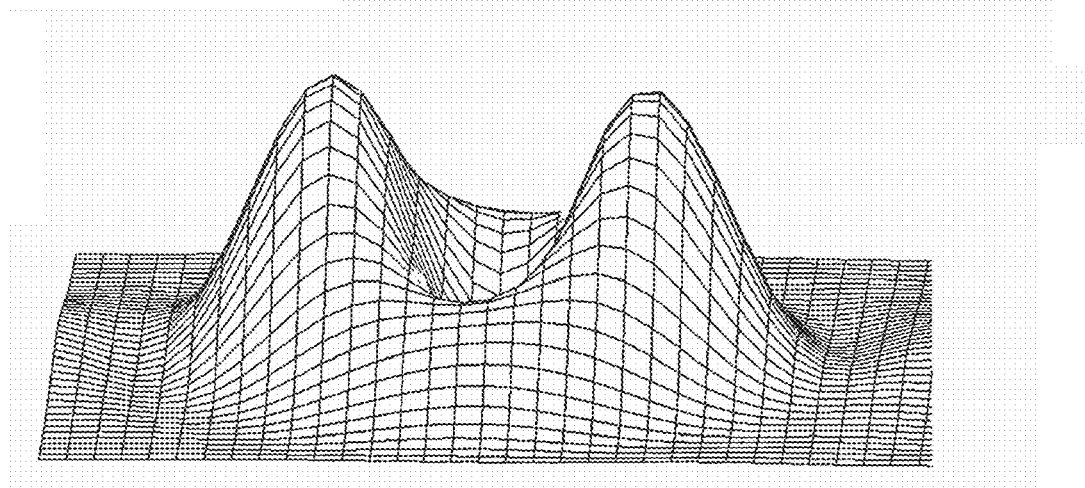

FIG. 9 presents the basics of two point's resolution in CVI. The pattern created by CVI, for two coherent points, separated by the diffraction limit, differs much from the two point coherent pattern. It is closer to the pattern of two points with opposite phase and provides a new direction for many applications limited by the Rayleigh criterion.

The range of $p_0$ in the vicinity of 1 is also of great interest; it enables a simple solution for the creation of optical vortices, as described by Volkh for a Gaussian beam. For an imaged point at the focal plane, for circular polarization the amplitude of the vortex wave function, as defined by Berry, is given by:

$$B_1(\rho, \rho_0, 0) = \frac{1}{kw^2} \int_0^1 dQ \sqrt{Q} \sin(\rho_0 Q) J_1(\rho Q) \qquad (2)$$

It can be approximated by:

$$B_1(\rho, \rho_0, 0) = \frac{\rho_0}{kw^2} \int_0^1 dQ Q^{3/2} J_1(\rho Q) \qquad (3)$$

Additionally, The Amplitude Transfer Function—ATF—represented by $\kappa(P, \theta_P)$, for right circularly polarized light, relates the input and output Fourier Transforms of the light distribution, through the relationship:

$$a_M(P,\theta_P) = a(P,\theta_P) \kappa(P,\theta_P) \qquad (4)$$

It is given by:

$$\kappa(P,\theta_P) = \cos(kR_0 P) d_R - i \exp(-i\theta_P) \sin(kR_0 P) d_L \qquad (5)$$

In this equations P and $\theta_P$ are the radial representation of the two-dimensional wavevectors $d_R$ and $d_L$ are the unit vectors of right and left circular polarizations, respectively. In the previous equation the first term, with the same handedness as the incoming field and a cosine dependence is the fundamental field and the second term, with inverse handedness, with an azimuthal dependant phase term and a sine dependence is the vortex term. For small $R_0$ the previous equation simplify to:

$$\kappa(P,\theta_P) = d_R - ikR_0 P \exp(-i\theta_P) d_L \qquad (6)$$

In this approximation, the fundamental field being identical to the incoming one and the vortex field containing a "P" component in the wavevector domain. The wavevector domain being a Fourier Transform plane, the "P" component in the Fourier Transform domain is equivalent to a derivative in the direct domain.

The crystal splits the circularly polarized optical field in two fields, the fundamental and vortex fields. The two fields are carried on two orthogonal circular polarization modes. The first optical field, the fundamental field, is an apodized version of the incoming field. Its polarization handedness is identical to that of the incoming field. The fundamental wave looks much like the incoming field.

The vortex field differs from the incoming optical field, in three different ways:

High Frequency Filter:

The optical information is carried by the high frequencies of the optical field. In most cases, the low frequencies components contains only slowly varying background, but may include a large amount of energy, which in turn, creates photon noise and reduces the contrast of the intensity image.

Orthogonal Polarization and Azimuthal Polarizer:

The transfer of a chosen part of the field to the orthogonal polarization can be used in two different ways, which delineate between the CVI and the PCI, described below.

In the phase mode, the fundamental field is absorbed by a polarizer and the vortex field is used. It removes the low frequency and the DC components of the incoming field, which had been transmitted to the fundamental field. The information consists of a phase and a minimal spatial coherence is necessary to express it in the final intensity image.

In the polarization mode, the fundamental field, in some cases attenuated to remove useless energy, is interfering with the vortex field. Because they are derived from the same incoming field, they interfere even in fully incoherent light. The information is carried as polarization information and can be detected by recording separately the two orthogonal linear polarizations and subtracting numerically the two images.

Vortex Phase:

The vortex phase term inverts the phase between pairs of terms, in the frequency domain, with the same k vector and opposite phases. It transforms amplitude to phase modulation (and vice versa). Its action is even more noticeable for line patterns, creating frequency doubling, reminiscent of phase masks—and their resolution enhancement—in Lithography.

These three effects can be used, separately or in combination, to improve contrast and resolution of optical information carried by the incoming optical field. Several different set-ups can be built depending on the addition of simple optical and polarization components. These concepts provide the way for numerous different devices, optimized for different applications, by modifying polarization, phase and geometrical optics components of the set-up.

The conical diffraction element modifies the incoming field in a very elaborate way; it modifies at the same time the amplitude, the phase and the polarization of the incoming field. In this respect, the conical diffraction element is the most potent optical element available to an optical designer.

Additionally, all these capabilities are obtained using an optical element which is amazingly simple to integrate in an optical system. From a practical point of view the conical diffraction element itself may be a simple piece of commercial, off the shelf, biaxial optical crystal. It does not necessitate exotic specifications. Its homogeneity requirements are inherently less stringent than those of non-linear optics; its polishing and orientation tolerances need only to adhere to "best practice requirements" of standard optical manufacturing.

As explained above, the fundamental field can be absorbed and only the vortex field is transmitted; which occurs for a CVI set up, or the fundamental field can be kept and brought to interfere with the vortex field; which occurs for a PCI set up.

CVI provides a new OST for coherent or partially coherent imaging. CVI provides contrast enhancement, optical field derivation, phase object imaging, sub-Rayleigh resolution and frequency doubling.

PCI provides a new OST able to work in coherent, partially coherent or fully incoherent light. PCI provides contrast enhancement, one-dimensional optical derivation, phase object imaging and sub-Rayleigh resolution. Several additional features of PCI are described below.

In CVI the fundamental field is absorbed and the outgoing field contains only the vortex field. A CVI setup may include, for example, an input circular polarizer, a biaxial crystal and a polarization analyzer, in order, where the polarization analyzer has handedness orthogonal to the input circular polarizer. One such setup is shown in FIG. 5. The biaxial crystal length is adapted to provide, as much as possible, for a given spot size and shape, as much as possible intensity in the vortex field.

Figure 13:
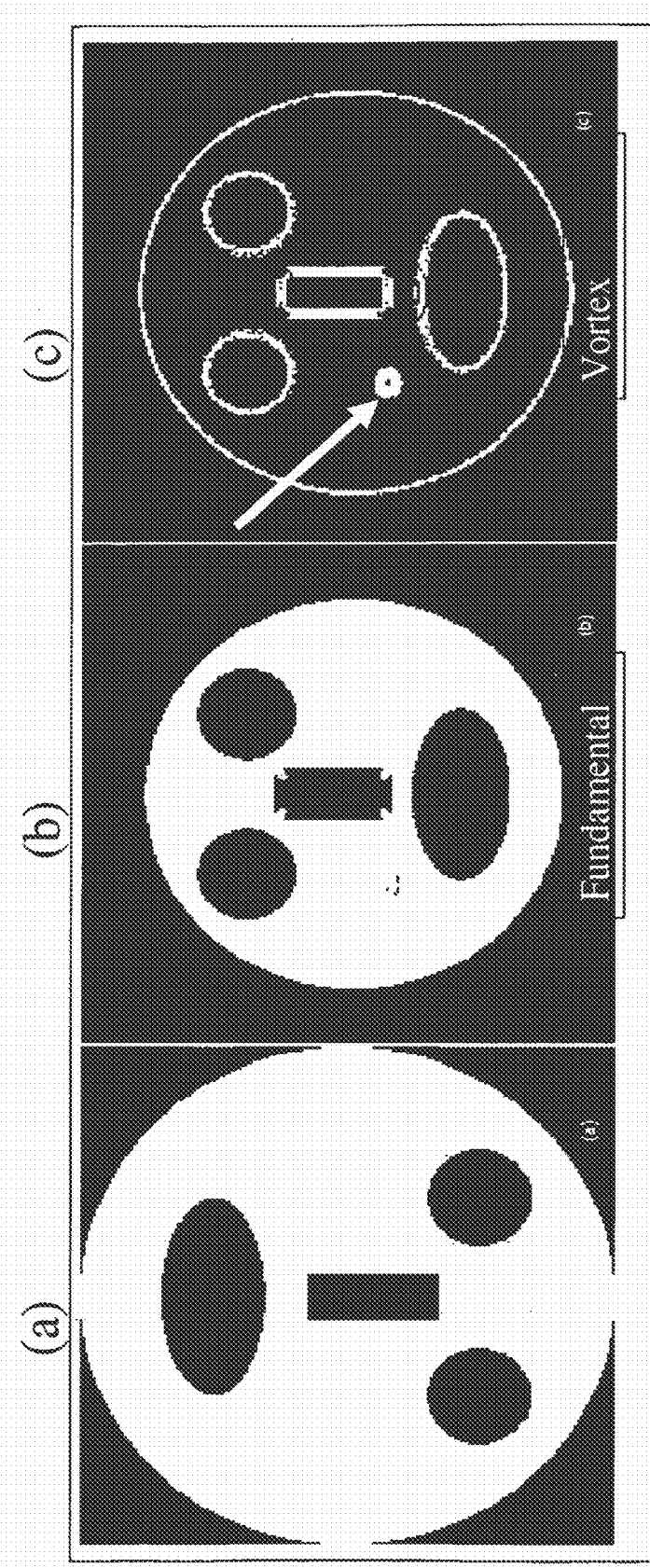
FIGS. 13 (a), (b), (c) illustrates simulations of optical derivation with CVI

FIG. 13 illustrates, using simulations, the concept of optical derivation using CVI. The same figure illustrates also contrast enhancement, and the phase object imaging. All three features are direct consequences of the high frequency filtering of the conical diffraction element. In FIG. 13, the picture shown in (a) represents an object, where a small phase defect has been added, but cannot be seen in standard imaging. In FIG. 13, (b) and (c) are pictures representing the simulations of the fundamental and vortex images, respectively, due to a conical diffraction. In FIG. 13, two points are resolved via CVI, below the diffraction limit, due to the phase inversion relative to the centre caused by the vortex term. Because of this, in a region positioned between the projection of the centre of the two points the amplitudes of the light incoming from the two points are inverted and also create a zero crossing. This feature permits resolution of points and small features below the Rayleigh limit.

An additional important feature of CVI is frequency doubling. For a dense array of small phase marks, as used in different arrays of metrology, the frequency of the marks is doubled. This feature is due to the phase term of the vortex field which translates, in a line pattern, to line doubling with the two lines having inverted phases. This feature allows an important improvement of the information content and of the precision of measurement of the position of the mark array.

In PCI the fundamental field is kept, as a reference field, and the outgoing field contains both the fundamental and the vortex fields. A PCI set up may include only a biaxial crystal and a linear polarization beamsplitter. The biaxial crystal length is adapted to balance, as much as possible, for a given spot size and shape, between the fundamental and vortex field.

Unlike other polarization based imaging concepts, an input polarizer is not required for the system for unpolarized light. This surprising feature is a consequence of Lloyd law, and will be explained in detail below. For Lloyd law, for an emergent cone from a biaxial crystal, the angle between the planes of polarization of any two rays of the cone is half the angle contained by the planes passing through the rays themselves and its axis.

Figure 11:
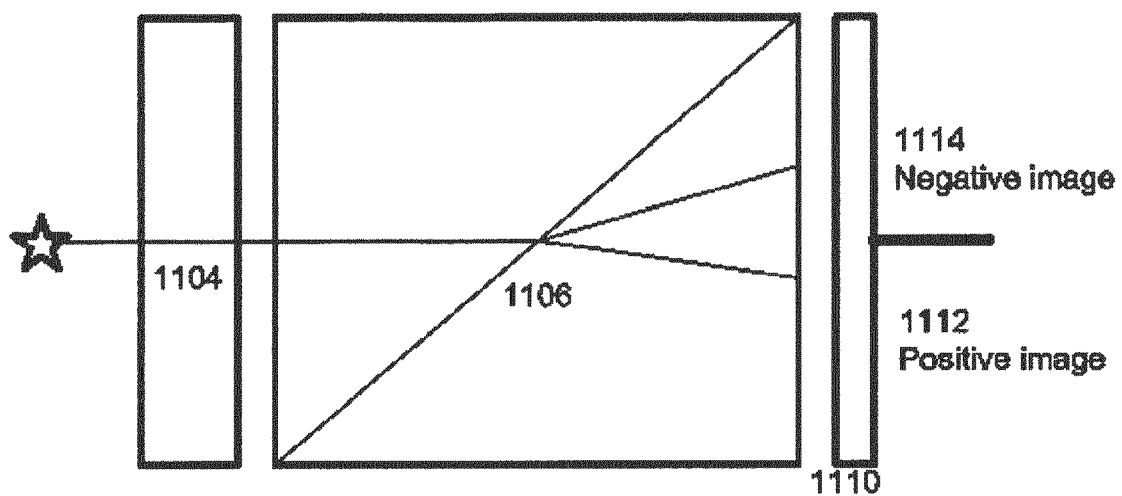
FIG. 11 illustrates a PCI set-up according to an embodiment of the invention.

A PCI set-up for this explanation is shown in FIG. 11, which includes a biaxial crystal 1104, polarizing beamsplitter 1106, and light detector 1110. The polarizing beamsplitter 1106 at its output, creates two separated images, with opposite polarizations. The two images will be referred as the positive image 1112 and the negative image 1114. The two images are then added and subtracted one from the other numerically.

Figure 12:
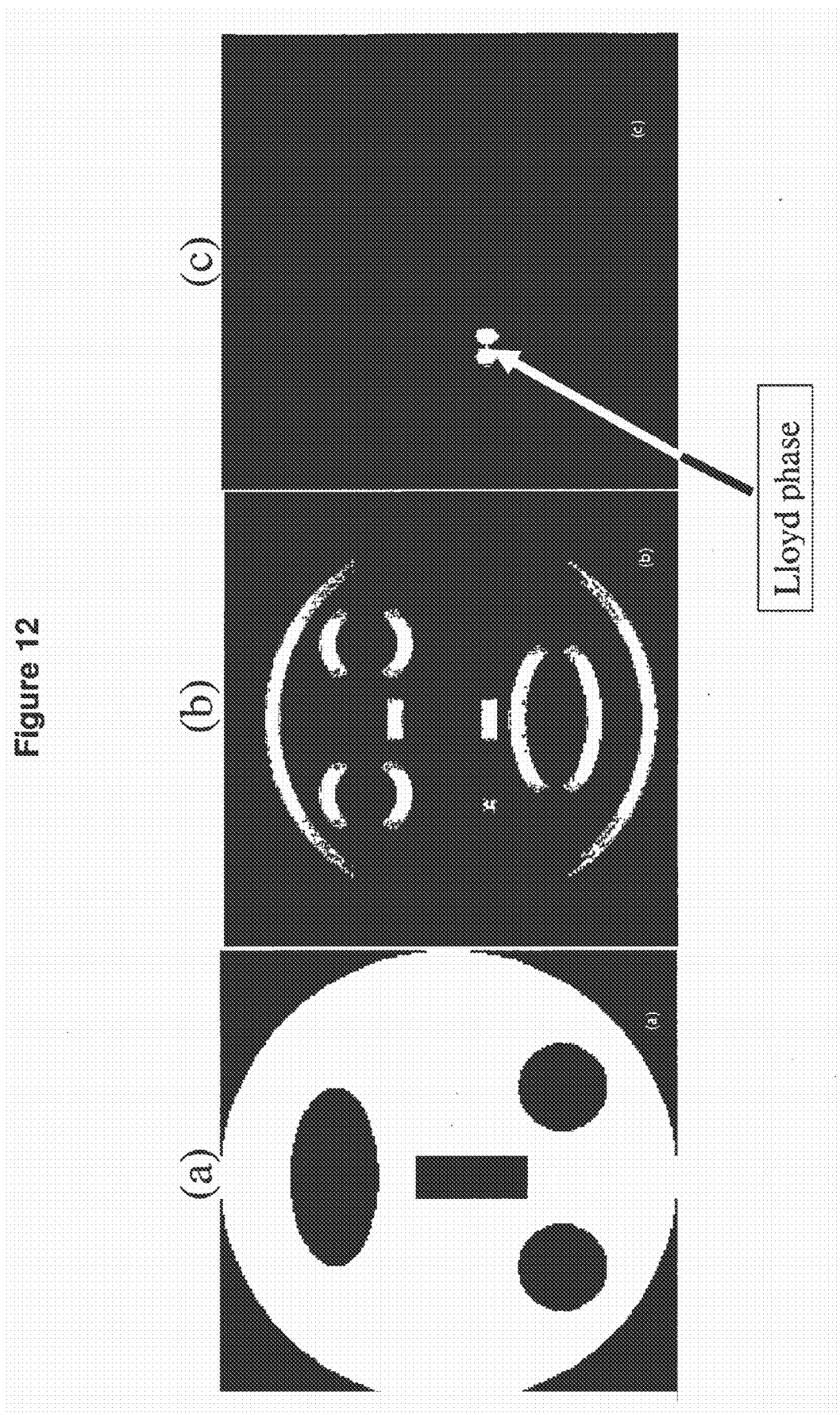
FIGS. 12 (a), (b), (c) illustrates simulations of optical derivation with PCI.

FIG. 12 in (a), (b) and (c) illustrate, using simulations, the concept of optical derivation using a PCI. In (a) the first picture represents an object, where a small phase defect has been added but cannot be seen in standard imaging. The picture in (b) presents the difference between the positive and negative intensity images obtained using PCI. As in CVI it creates derivative image, however, it differs from CVI by derivating only in one direction in a way reminiscent of the DIC microscope. We present in the image the absolute value of the signal. In (c) the image presents the concept of phase objects separation based on the extended Lloyd law as explained bellow. The same FIG. 12 illustrates also contrast enhancement, and the phase object imaging (for coherent and partially coherent light). All three features are direct consequences of the high frequency filtering of the conical diffraction element. As always, since no good solution exists to present bipolar images in black and white, the solution which is used is the most acceptable, representing the absolute value of the image in (b).

The two points creates, in the region positioned between them, light with orthogonal polarizations. This property permits the discrimination for two point sources, in the area between them, between the light incoming from the sources from the left and right. This physical property creates an additional segregation mechanism, able to differentiate optically in any spatial position between light incoming from different angles. This mechanism translates into additional resolution using a polarization mode imaging, in which the two polarization images are recorded separately. PCI being dependant on polarization variables is able to perform adequately for fully incoherent light.

FIG. 14 illustrates an improvement of resolution due to PCI using simulations. The standard imaging (a)-(c) shows its normal behavior; the two points are barely separated by the well-known 26% dip at Rayleigh criterion and are not separated at 75% Rayleigh criterion. The PCI (d)-(f) distinguishes clearly between a single point and two points positioned either at Rayleigh distance or even at 75% of DL. While additional processing may be needed, the information is clearly available as shown in FIG. 14.

PCI may be applied directly to unpolarized light without the need of an input polarizer. By contrast, in other polarization based optical systems, for unpolarized light, an additional input polarizer is necessary to polarize the incoming light. To avoid losing half of the energy, many systems use an input polarizing beamsplitter, and carry the light in two separate channels adding some complexity to the system.

Lloyd law avoids the inherent loss of half the energy inherent in all polarization optics systems, without the need to separate in two separate channels. It may be considered that the biaxial crystal is its own polarizer even if its azimuthal angular variation makes it quite special.

The present inventors have determined, from both theory and simulations that Lloyd law applies only to amplitude objects. For phase objects the image of the right and left circularly polarized light differs. This new feature, which we call Lloyd extended law, exists to our knowledge only in PCI, and opens an interesting way to differentiate phase and amplitude of small objects. A new optical set-up can be realized, able to separate phase objects and defects from amplitude variations show in (c) of FIG. 12. The set-up is simply a PCI set-up, separating the two input circular polarizations on two channels.

Three main functions are performed by imaging systems: measurement and metrology, detection and counting, imaging of an optical object.

A measurement system is aimed to detect the exact position, at a given time, of a known feature. The feature may be a star in Astronomy, a fluorescent point in Biology or an AIM structure in Overlay Metrology, for example. A detection (counting) system is aimed to detect the presence of a particle. The particle may be a star in Astronomy, a defect in machine vision or a fluorescent point in Biology, for example. An imaging system is aimed to transfer to an observer a faithful representation of a general unknown optical object.

The parameters describing the performances of a system need to take into account its function and cannot be only of a general nature. A system, improving the visual impression may—or may not—increase the positioning capacity or the accuracy of detection of a particle. Because of this, the Rayleigh criterion cannot be the only metrics.

We define the contrast of a target or of a particle, as the ratio of the difference between the minimal and maximal signals and the dynamic range of the detector, in an optimal alignment.

For measurement, the adequate metrics is the information contents as defined by Seligson for Metrology. A similar concept, intrinsic imprecision, introduced by Lindegren is used in Astrometry. The information content, for a one-dimensional optical feature represented by a function $f(x)$, is defined as:

$$E_0 = \int \left(\frac{df}{dx}\right)^2 dx \quad (7)$$

It is equal to the variance of the error of the feature position for an optimal algorithm.

A detection system is directed to detect the presence or absence of a particle in a given field. One of the main applications is particle counting and defect inspection. The metrics used is the capacity to detect particles with low contrast and/or low size. It is quantified experimentally by the number of correct hit/miss of a particle/defect, with a given size, shape and contrast using a standard detection algorithm. A system will correctly detect a particle of a given size and contrast if its number of hit/miss is above a predetermined threshold.

For imaging the criterion remains the diffraction limit or extended Rayleigh criterion (DL). However, many optical systems use either acquisition of several images and data merging or powerful algorithmic for post-processing of the intensity data.

Overlay Metrology, in Semiconductor Lithography, refers to systems which purpose is to measure the relative position of two superposed layers and to assess that their position one relative to the other is within a specified tolerance. Several technologies are in use for overlay metrology including scatterometry and SEM.

The workhorse of Overlay Metrology has been the Imaging Overlay Metrology systems. Over the last 15 years, imaging techniques using overlay fiducial marks have met the needs of overlay metrology. As the current 45 nm node drops to 32 nm and below, the future of imaging techniques is being threatened due to the optical diffraction limit.

Typically, imaging overlay metrology systems are comprised of an imaging system imaging overlay fiducial marks positioned on each one of the layers. The main fiducial mark used up to the 65 nm node was the Box in Box or Frame in Frame whether new marks have been introduced for the lower nodes as the AIM marks family.

The main problem with conventional imaging overlay metrology is indeed due to the optical diffraction limit. Because overlay metrology can use wavelengths in the visible, or the near UV, the diffraction limit creates a limit on the motif size available. Although clever algorithmic had been developed to measure the position of the fiducial mark to a fraction of the diffraction limit, reaching the 1 nm precision, these algorithms are less and less robust and less prone to process variability for larger ratio of the required precision to the diffraction limit.

While these devices may be suitable for the nodes above 45 nm and possibly for the 32 nm node, they are not as suitable for enabling Imaging Overlay Metrology to reach the precision level necessary for the 22 nm node or below. Additionally, the new technique of Double patterning creates additional requirements on Overlay Metrology by creating an additional step with higher overlay requirements and using materials, as hard coatings, which reduce greatly the contrast of the overlay mark image.

CVI and PCI provide additional precision which may permit the extension of overlay metrology systems, without major modifications, towards the 22 nm node.

Using CVI or PCI on fiducial marks, instead of standard imaging creates a situation in which the full surface contribute to the signal, and not only the edges; it makes theoretically the system more prone to asymmetry error referred as TIS—Tool Induced Shift—and WIS—Wafer Induced Shift. Additionally, fiducial marks can be of a very small size (as low as actual Moore's nodes), without affecting their information content. By reducing the target size, one of the major error sources of Overlay Metrology, the Placement Pattern Error (PPE) is lowered.

Optical defect inspection, detecting and classifying optically defects is a major requirement in Lithography, as well as in Flat Panel Display, in Machine Vision, in Steel and Paper industries, as well as in any discipline in which surface defects can impair the quality or function of a device or part.

The additional detectivity contained in CVI and PCI can be translated in the ability to detect defects with lower contrast or size and to increase the probability of detection and the classification accuracy of defects.

CVI and PCI have applications to optical storage where the disk is the physical layer in optical storage. The performances of any optical storage system resort to its capacity to separate two pits with minimal length. The minimal pit is, in DVD and HD-DVD, using the EMF coding/decoding scheme, a "3T" mark; in Blu-Ray it is a "2T" mark using the 1.7 pp scheme. CVI and PCI will permit reducing the track pitch and the minimum pith length, independently of the technology of realization of the pit or land on the disk substrate.

Additionally, the current generation had evolved in two competing, incompatible standards, HD-DVD and Blu Ray. An hybrid OPU able to read both standards in a single OPU is badly required by the users of optical storage. To permit to the user to read both standards on the same reader necessitates a very complex and expensive optical system due to the inherent complexity of each one of the standards. The Blu Ray had reached the huge Numerical Aperture of 0.85, used only in Lithography and high end Microscopy. The HD-DVD had reach the high but lower Numerical Aperture of 0.65 but unlike Blu Ray kept the original thickness of the optical disk, making the system strongly dependant on coma aberration especially caused by a slight tilt of the disk surface. These two extremes requirements are quite mutually exclusive and a hybrid OPU able to read both standards are almost impossible or at least very difficult to realize.

The additional resolution of CVI and PCI described in this application can be translated either in reading pits and lands closer to one another then in previous technologies creating additional resolution. Additionally it can be used to read existing optical disks with lenses of lower Numerical Aperture and a much lower complexity. This will allow the realization of a hybrid OPU, able to read both HD-DVD and Blu Ray at a reasonable complexity and cost.

In a more evolved version, CVI or PCI allow detecting several close pits at once, increasing both the capacity and speed of an optical storage systems by reading denser marks in groups at higher speed.

Differential Interference Contrast (DIC) microscopy is a powerful visualization tool used to study live biological cells, but its use so far has been limited to qualitative observations. The inherent non-linear relation between the object properties and the image intensity makes quantitative analysis difficult. Additionally the DIC output intensity depends on a directional phase gradient and is a mix of amplitude and phase gradients. The peculiar properties of CVI and PCI, namely the capacity of CVI to create an isotropic derivative and the capacity of PCI to separate phase and amplitude information using the extended Lloyd law open new avenues to phase object imaging, both for qualitative and quantitative measurement especially in Biology.

Figure 10:
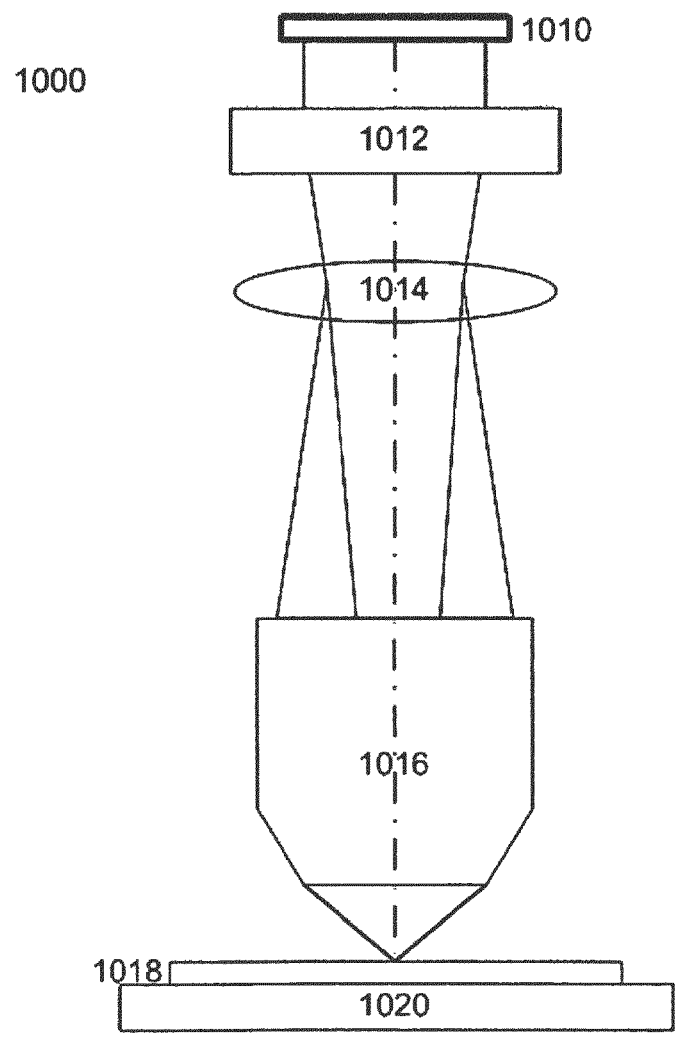
FIG. 10 illustrates an optical system according to an embodiment of the invention which incorporates an optical device such as that of FIG. 5 or FIG. 6, and which may be used for optical metrology applications.

FIG. 10 illustrates an optical system 1000 according to an embodiment of the invention which incorporates an optical device such as that of FIG. 5 or FIG. 6. The system 10 has applications for metrology, for example. The system 1000 includes a projection lens 1016 arranged to receive light from an object to be viewed 1018, such as a wafer, on a substrate 1020. An imaging lens 1014 is arranged to receive light from the projection lens 1016. An optical detector 1010, such as a charge coupled device (CCD) is arranged to receive light imaged by the imaging lens 1014. In the case the system incorporates an optical device such as the PCI system of FIG. 6, the optical detector 1010 may comprise two optical detectors, for of each channel of the beam splitter. The detector 1010 may be a pixelated detector such as a charge coupled device (CCD) detector. The optical detector 1010 may comprise a single CCD detector, wherein two images fall on two different regions of the CCD detector, or two, or four separate CCD detectors, for example. The system also include an optical device 1012, such as that described with respect to FIG. 5 or 6 arranged between the imaging lens 1014 and the optical detector 1010, where the optical device 1012 provides improved resolution. The system 10 has applications for metrology, such as for determining the position of a fiducial mark. In this case, the object to be imaged by the system may a fiducial mark, for example, and data retrieved based on the light received by the optical detector 1010 may provide the position of the fiducial mark.

An additional domain in which quantitative measurement of phase objects is required is that of reticles and masks inspection for Lithography. The complexity of masks growing tremendously in the newest nodes create the need to use phase masks and also the need to measure and characterize them quantitatively The low $\rho_0$ conical diffraction provides a very simple mechanism to create an array—or a volume—of achromatic optical vortices. It separates the generation process in two independent steps:

creating an array or volume of point emitters.

using the conical diffraction, each emitting point being replaced by an optical vortex.

In short, any light distribution consisting of a volume of light points will create a volume of vortices with a one to one correspondence between the point spatial position and the vortex centre.

A proper choice of material permits the realization of achromatic vortices. From a practical point of view the main advantage of a conical diffraction set-up for creating optical vortices, compared to existing set-ups based on holography, is the removal of the coherence requirement. Such a set-up may use high power laser diodes, which can provide tens of Watts, in a miniature package and for a ridiculous cost. Several low cost technologies and devices, developed for example for display applications, may be used for creating sequentially or in parallel, arrays and volume of point sources. Additionally, the vortex wave being orthogonally polarized to the incident beam, much spurious light intensity, as scattering or reflections, will be removed efficiently from the set-up.

The doughnut shaped beam is similar to the vortex, with two distinctions:

The set-up used is the doughnut beam set-up described in FIG. 6 instead of the conical vortex set-up of FIG. 5, The polarization variable in a doughnut shaped beam is rotating around the azimuthal angle at the same rate as is the phase variable in a vortex wave.

In conical vortex imaging and polarization conical imaging, the light is transformed from a linear optics shape to a singular one. Complimentarily, in the reconstruction process, the singular beam is transformed back into the initial light distribution. This characteristic permits integration of singular optics as part of an optical system, as a reversible intermediate processing step.

The reconstruction set-up is presented in FIG. 7; a first biaxial crystal 701 is cut with its geometrical optical axis aligned with one of the optical axis. A second crystal 705, identical to the first one, is placed after the first biaxial crystal 701. A polarization rotator 704, with a rotation angle of $\pi/2$ is inserted between the two crystals. The action of the polarization rotator 704 can also be described as the addition of an additional phase of π radians to one of the circular polarized components. Let describe the case of a right-handed circular input polarization. The ATF—Amplitude Transfer Function, which can be calculated from Berry's equations—of the complete set-up, $\kappa_{REC}(P)$, is given by the multiplication of the ATF of the first crystal, the rotator Jones matrix and the ATF of the second crystal:

$$\kappa_{REC}(P) = \kappa(P, \theta_P, R_0, Z) \begin{pmatrix} \cos\frac{\pi}{2} & \sin\frac{\pi}{2} \\ -\sin\frac{\pi}{2} & \cos\frac{\pi}{2} \end{pmatrix} \kappa(P, \theta_P, R_0, Z) \quad (8)$$

Reorganizing and grouping the different components leads to:

$$\kappa_{REC}(P) = \exp(ikZP^2) \quad (9)$$

The transfer function consists of a propagation term along a distance corresponding to an isotropic media of index $n_2$ with thickness equal to the thickness of both crystals.

Two variations of the reconstruction set-up can be used: In the first one, both the fundamental and the vortex waves are kept after the first conical diffraction set-up. This is the case described in the previous equations. The reconstruction does not contain a conjugate image. It performs mathematically a reciprocation of the light wave and because of this is identical to the incoming light distribution. In many cases we will keep only one of the waves, in most cases the vortex wave. The reconstruction contains a conjugate image. The first term is the reconstruction term and has the same handedness as the incoming wave. The third term, the cross term, can be removed using a right-handed circular polarizer. The second term is a conjugate image, as in holography; however, unlike in holography the light of the conjugate image, for each point, is concentrated on a ring with radius $2R_0$ instead of being spread on the full surface.

The conical diffraction, reconstruction, vortex and radial polarizer set-ups can be extended to the case in which the input light distribution is represented as an assembly of sources, in a plane or in a volume. Such a light distribution will create an assembly of diffracted points, each one centered, laterally and longitudinally at the conjugate point of the source. This feature can be applied to Poggendorff rings, to vortices and to radially polarized distributions.

The intensity contains, folded into the azimuthal dependence, all the information on the polarization state of the incoming light. The only ambiguity is in the case whether either $j_R$ or $j_L$ are zero, i.e. in the case of circularly polarized light, in which, as stated before, we cannot distinguish the handedness of the light polarization. The intensity and polarization of the output light distribution is identical for unpolarized light, to the intensity of the two circular polarized modes. It is a corollary of the previous discussion because unpolarized light can be represented as a superposition of left and right circularly polarized light with random phase.

The internal conical diffraction creates a mapping of the polarization into the geometrical domain. For a centrosymmetric beam, the polarization state is unfolded into the azimuthal dependence of the light distribution. The whole information on the polarization state of a polarized light distribution is retrievable from the azimuthal light distribution. Even the unpolarized light may be distinguish from a linear polarized light, even if it cannot be separated from circularly polarized light.

Internal conical refraction may provide a simple set-up for a full polarimeter, as compared to many conventional polarimeters and ellipsometers. Some of the conventional polarimeters and ellipsometers necessitate the acquisition of a time sequence of several frames, limiting their use for fast varying phenomena. Others are based on polarization selective elements, but the retrieval of the full polarization state for elliptically polarized light is cumbersome. Internal conical refraction may provide a simple set-up for a full polarimeter able to acquire either pulsed light or star images.

From an application point of view, for annular illumination, widely used in lithography, microscopy and machine vision, the conical diffraction set-up performs three functionalities at once; it creates an annular pattern, homogenises the light distribution and transforms the unpolarized light into a polarized one, without losses. However, the axis of the polarization direction is rotating by 90 degrees along the azimuthal direction; in most applications it has to be modified by appropriate additional polarization elements.

Azimuthal coherence is a new coherence state created by an incoherent or partially coherent illumination passing through a conical diffraction set-up. It may create new optical functionalities, especially in the domains of Microscopy, Lithography, and Spectroscopy and machine vision. Following the Van Cittert-Zernike theorem, the incoherent light source is represented by the incoherent superposition of the intensities at the detection plane, of a collection of small coherent emitting points, propagated along the optical system. Using the equivalent light distribution concept, each small coherent emitting point is replaced by an equivalent light distribution. This light distribution is coherent and is of a large geometrical extent. It can include points far away one from the other, which propagation regime may differ markedly. Propagating further the light, in some configurations, light emerging from one part of the equivalent light distribution may reach the same spatial position as light emerging from another part of the light distribution. This case is especially meaningful if the light illuminates a grating—or a grating like structure as a mask. In this case, depending upon the choice of proper geometrical parameters, different orders of the grating may interfere coherently, created by light originating from different geometrical position on the equivalent light distribution, even if at the beginning they were created by a small emitting point. The application of azimuthal coherence for illumination allows coherent interference using incoherent light. Azimuthal coherence is a first example of spatially tailored coherence states, which may be especially useful in Lithography.

The conical diffraction set-up is a very efficient angular filter; the angular aperture can be reduced to the order of a few minutes of arc or below. It is a corollary of the small angle limitation of internal conical diffraction. The capacity to assess, in the optical domain, the angle of the axis of a centrosymmetric light distribution opens the way to several practical devices. It is a more robust solution then a Fabry-Perot based device, and does not suffer from the Fabry-Perot strong wavelength and temperature dependence.

As an example, we describe a very simple device in the embodiments, potentially adapted to optical control. Numerous systems in robotics and automation can be reduced to a "six axes" problem, i.e. bringing a rigid object at a predetermined spatial and angular position to perform a task. In many applications, it is required to assess that the object is at the right position, spatially and angularly, before performing the task. To measure or assess simultaneously, in real-time, the six parameters representing the spatial and angular variables is quite complex. The solutions used today are based either on the use of several sensors and the merging of the information or on stringent design of the system in order to reduce the number of degrees of freedom.

For example, let an emitter, creating a circularly symmetrical beam; be rigidly attached on the object to control. This emitter is characterized by its position, but also by the geometrical axis of the emitted beam. The receiver includes a conical diffraction set-up. The light distribution is, after passing through the conical diffraction set-up, imaged on a small image detector and analyzed by an adequate algorithm. If the source is exactly aligned with the optical axis of the crystal, the light will experience conical diffraction and create Poggendorff rings. The presence of Poggendorff rings instead of light points, assess that the tilt and yaw of the object are in a predetermined angular range. The roll variable, the most elusive parameter to be measured in optical control, can be retrieved if the light is linearly polarized. A simple solution is the measurement of the angle of polarization of the emitter. The translation of the roll variable into an azimuthal distribution permit to retrieve the roll variable using the common tools of machine vision. The coding of the angular information into the light distribution spatial distribution is performed in the optical domain. Because of this, the spatial information of the same beam has not been destroyed and can be measured to complete the device function. The two lateral positions can be retrieved from the motif centroid.

The dependency of the vortex wave upon the spatial frequency in coherent light creates a simple mechanism to remove coherent background. In the following we show that for a wave made of a small signal and a large background, all the energy of the background light is transferred to the fundamental wave; the energy of the signal is split between the background and vortex waves. This effect will occur only for coherent and partially coherent background whether the signal is coherent, partially coherent or incoherent. Let an incoming distribution represents a small amplitude or phase object on a background. It is given by:

$$D_1(R,0) = Cd_B(R,0) + \in d_s(R,0) \tag{10}$$

The difference between amplitude and phase objects is contained in the variable $\in$, which is real for an amplitude object and imaginary for a phase object.

For a background represented by a coherent uniform distribution of amplitude C and radius V, the Fourier Transform of the incoming light is given by:

$$a_B(P) = C \frac{kV}{P} J_1(kVP). \tag{11}$$

The fundamental and vortex waves are given, for the background, by:

$$B_{0B}(R, R_0, Z) = \tag{12}$$
$$Ck^2 V \int_0^\infty dP J_1(kVP) \exp\left\{-\frac{1}{2}kZP^2\right\} \cos(kR_0P) J_0(kRP)$$
$$B_{1B}(R, R_0, Z) =$$
$$Ck^2 V \int_0^\infty dP J_1(kVP) \exp\left\{-\frac{1}{2}kZP^2\right\} \sin(kR_0P) J_1(kRP)$$

For $R_0 \ll V$, the cosine term $\cos(kR_0P)$ can be approximated to one and the fundamental wave does not differ markedly from the wave which will have propagated without the crystal. For a stop, covering half the background radius the energy of the background can be reduced, in the vortex wave,—for a perfect polarizer by $10^5$-$10^6$.

Homogenization: the conical diffraction set-up homogenises the light distribution because it scrambles the light in the azimuth dimension.

CVI opens new potentialities to detect two points, close one to the other, below the diffraction limit. The venerable two stars problem has indeed applications in almost all optical disciplines. CVI has applications in Astronomy, Lithography, machine vision or optical storage, to name a few, and any other optical application necessitating separating two close optical peaks.

An optical device, made of a homogeneous material, in which the material boundaries consist of planar surfaces, is shift-invariant, neglecting vigneting issues. From a geometrical optics point of view, the transfer function of such a device is independent of the field variable, removing all field related aberrations, of any order, as coma, astigmatism or distortion. This characteristic simplifies much the subsequent optical design of all crystal optics based devices, including conical diffraction set-ups.

For a point positioned at $Z_1$ from the entrance face of the crystal, its ATF is given by the ATF of propagation in space by a—corrected—distance of $Z_1$ $$\kappa_Z(P, Z_1) = \exp\left\{-\frac{1}{2}ikZ_1P^2\right\} \tag{13}$$

It can be modified—by replacing Z by $Z'=Z+Z_1$—to include the propagation term before the crystal. In this case the zero of the longitudinal corrected parameter is positioned at the input light distribution original position. The modified equation represents a system independent of the longitudinal position of the crystal, simplifying much the optical and optomechanical design of the system. The shift and longitudinal invariance of conical diffraction simplifies greatly the optical design and the engineering of the system. The angular alignment of the geometrical axis of the incoming light relative to the optical axis of conical diffraction is stringent. In specific cases it is very small, reaching even a few minutes of arc. Even so, this tolerance is easily achievable by modern optical technology and precision assembly. In other systems, this constraint will have to be dealt with from the earliest stage of system design.

KTP, KTA, LBO, MDT, YCOB, LiInS$_2$, and LiInSe2 are examples of crystals suitable for the biaxial crystal component of embodiments of the invention. All these crystals are available commercially with large dimensions, very high homogeneity ($\delta n \sim 10^{-6}$), good parallelism, optical flatness and surface good quality. In the UV, especially in the deep UV, LBO is the choice for conical diffraction. Its transmission window extends to 193 nm, with a small transmission penalty. In the visible and in the near infrared, between 400 and 1300 nm, YCOB, KTP, MDT and LBO may be used unless a very large conical effect is necessary. YCOB has the clear advantage of a full paraxiality and a very small wavelength dependence of the optical axis direction. Around 1550 nm, MDT and KTP may be used. All of them provide easily a chromaticity in the entire telecommunications window, extending from the lower wavelength of the S-band, to the higher wavelength of the L-band.

In the SWIR and MWIR wavelength ranges, between 1000 and 5000 nm, MDT, KTP, and KTA (a KTP isomorph) may be used. KTP is achromatic for the SWIR range, between 1000 and 3000 nm. Above these wavelengths, in most of the LWIR range, up to 12 μm, LiInS, LiInSe$_2$ and Sn$_2$P$_2$S$_6$ are available.

Additionally organic crystals, as POM, DAST, MBANP or NPP with very large cone angle are available Theoretical diffraction parameters, $\theta_0$, A (and $R_0$) depend on the difference between the dispersion of the indices and can made close to achromatic for some materials. In most practical applications, the variation of the optical axis direction, $\theta_0$, is critical and has to be kept to a fraction of the material parameter, $\overline{A}$. Fortunately the variation for some crystals of the optical axis direction is very small. In MDT, between 540 nm and 700 nm, the direction varies by less then 0.1 degrees. In KTP, the angle varies by 0.05 degrees between 1350 nm and 2100 nm and less then 0.02 degrees on the telecommunication window—1450 nm to 1650 nm. YCOB varies by close to 0.3 degrees on the huge range of 400 nm to 1300 nm. On the other hand, $\theta_0$ may vary strongly in some crystals, for example MBANP. Additionally, achromatization of a conical diffraction set-up does not differ intrinsically from the standard procedure of correction of chromatic aberration in geometrical optics. Simple achromatization solutions using a single or double-wedged plate exist, based on the natural dispersion of glass. However, the addition of any dispersive element has to be taken into account in the overall system design. A slight modification of the material parameter maybe also quite easily tolerated. In vortex applications, the variation will not be noticed; whether in large $p_0$ applications it will create a dispersion of the conical radius. It may also be compensated as part of the overall chromatic design of the system. In some crystals, such as YCOB and KTP, it can be of second order in comparison to the natural dispersion of refractive elements. For orthorhombic and triclinic crystals the optical frame coincides with the crystallographic axes. For monoclinic crystals the two sets of axes differ. In monoclinic crystals the relative orientation of the optical frame and the crystallographic axes depends on the wavelength creating an optical axes dispersion, which has to be accounted for in the chromatic design. Methods have been developed to measure separately the variation of $\theta_0$, and the orientation of the optical frame, as a function of the wavelength.

Figure 15:
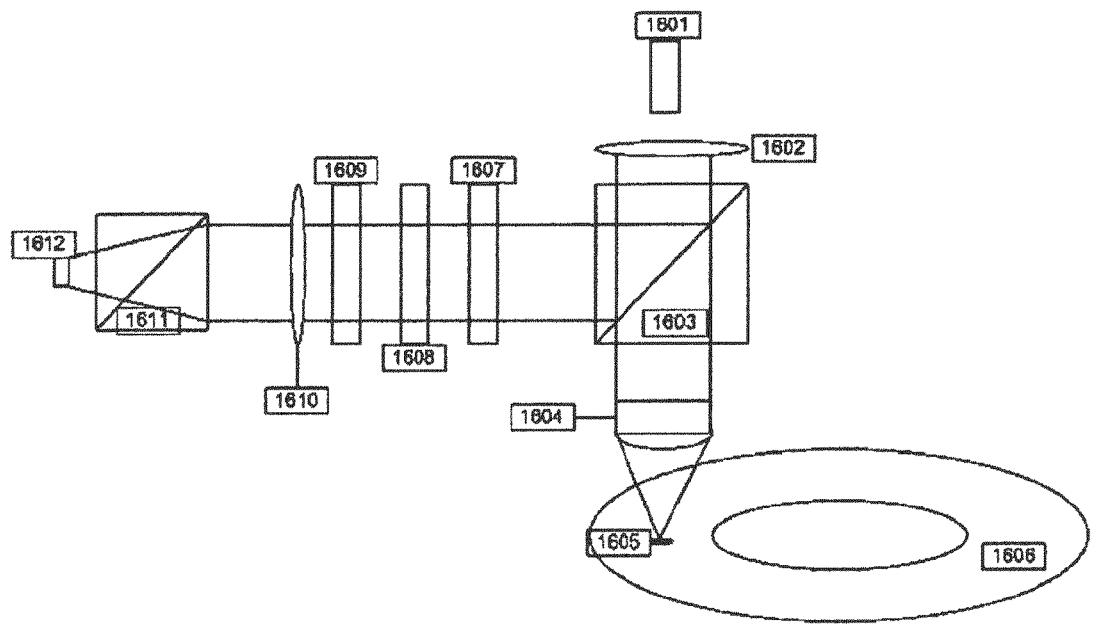
FIG. 15 illustrates a CVI optical system according to an embodiment of the invention for use as a optical storage system.

FIG. 15 illustrates an optical system for use in optical storage including a CVI set up. The system includes a light source 1601, such as a laser diode, for providing light. Light from the light source 1601 is collimated by the lens 1602, and directed to the polarizing beam splitter 1603. Light from the polarizing beam splitter 1603 is directed to focusing optics 1604 and then focused onto a spot 1605 on the optical disk 1606. Light reflected from the spot 1605 passes back through the focusing optics 1604 and is directed by the beam splitter 1603 to a CVI setup including a quarter wave plate 1607, which acts as a circular polarizer in conjunction with the beamsplitter 1603, biaxial crystal 1608 and circular analyzer 1609, such as a quarter wave plate, in order. Together the elements 1601-1604 constitute an imaging module which is arranged to provide imaged light from the spot 1605 to the first quarter wave plate 1607. The light is then focused by focusing lens 1610 and passes through beam splitter 1611 and onto a detector 1612, which may be a single or dual detector or quad detector, for example. The detector 1612 may be a pixelated detector such as a charge coupled device (CCD) detector. The detector 1612 may one of a single light detector, a segmented light detector, or a light detector comprised of a matrix of elements, for example.

Figure 16:
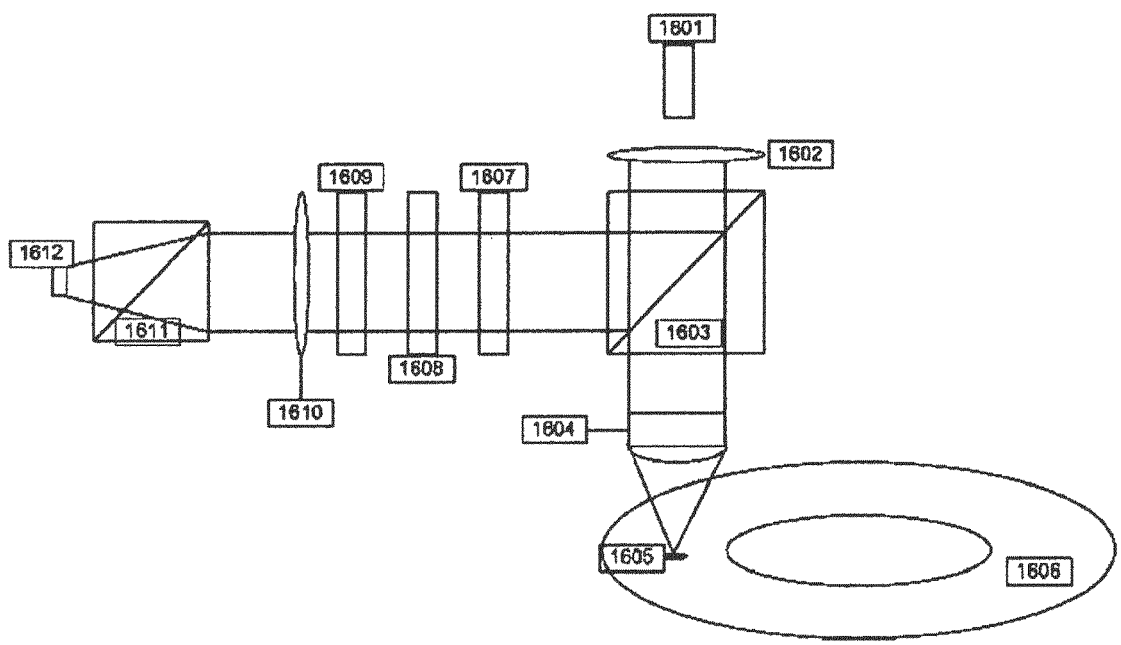
FIG. 16 illustrates a PCI optical system according to an embodiment of the invention for use as a optical storage system.

Alternatively to the CVI set up in FIG. 15, a PCI setup may be used as shown in FIG. 16. This system comprises a light source, such as a laser diode, providing light. Light from the light source is collimated by a lens 1602, and directed to a polarizing beam splitter 1603. Light from the polarizing beam splitter 1603 is directed to focusing optics 1604 and then focused onto a spot 1605 on the optical disk 1606. The light reflected from the spot 1605 passes back through the focusing optics 1604 and is directed by the beam splitter 1603 to a PCI setup including a quarter wave plate 1607, which acts as a circular polarizer in conjunction with the beamsplitter 1603, biaxial crystal 1608 and circular analyzer 1609, such as a quarter wave plate, in order. Together the elements 1601-1604 constitute an imaging module which is arranged to provide imaged light from the spot 1605 to the first quarter wave plate 1607. The light is then focused by focusing lens 1610 and passes through beamsplitter 1611. The beamsplitter 1611 is arranged to provide linear orthogonal polarizations in two channels onto two detectors 1612 and 1613, which may be a single or dual detector or quad detector, for example. The detectors 1612 and 1613 may be a pixelated detector such as a charge coupled device (CCD) detector. The each of the detectors 1612 and 1613 may one of a single light detector, a segmented light detector, or a light detector comprised of a matrix of elements, for example.

Figure 17:
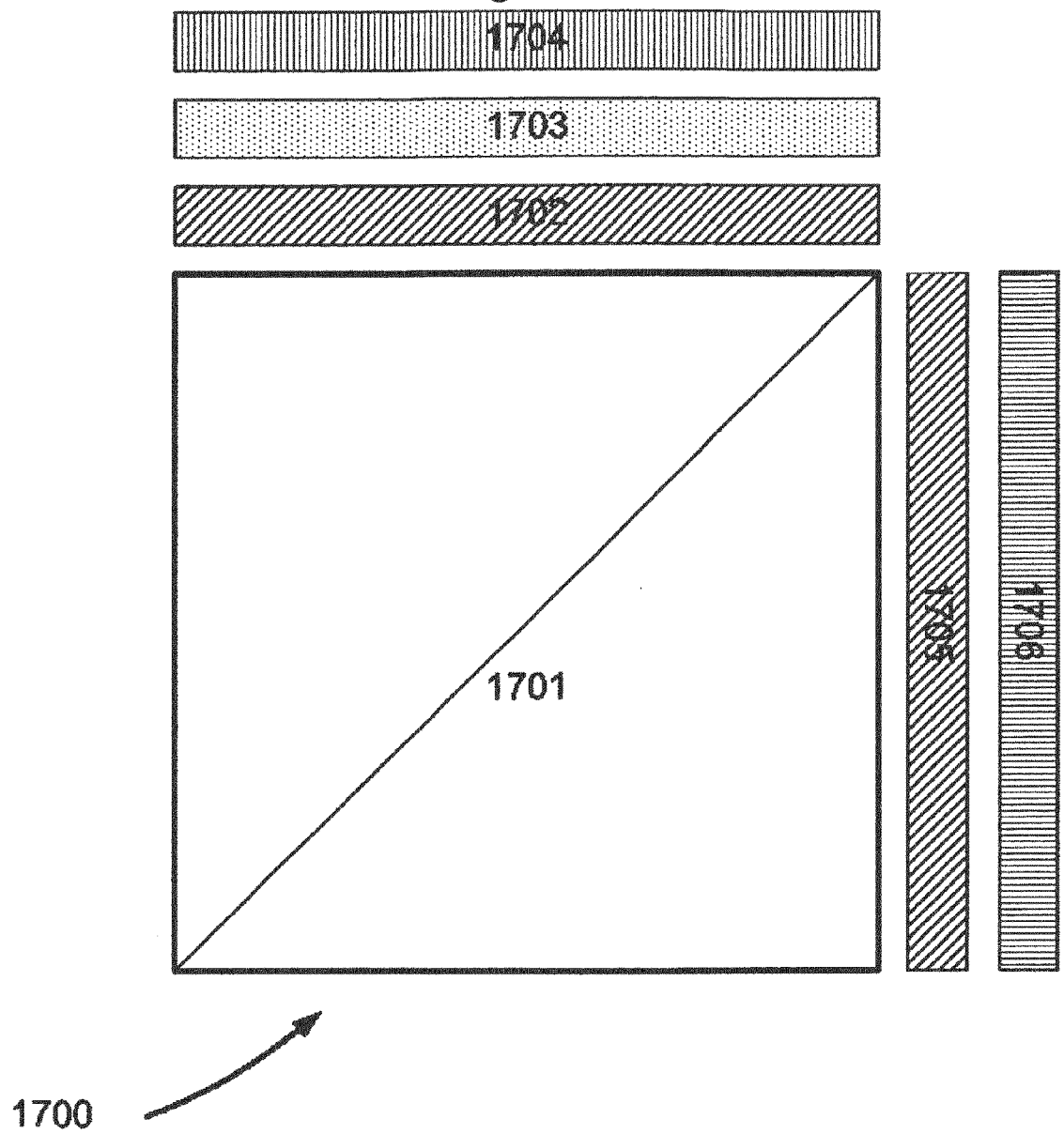
FIG. 17 illustrates a PCI optical system according to an embodiment of the invention for use as a polarimeter or ellipsometer.
Figure 18:
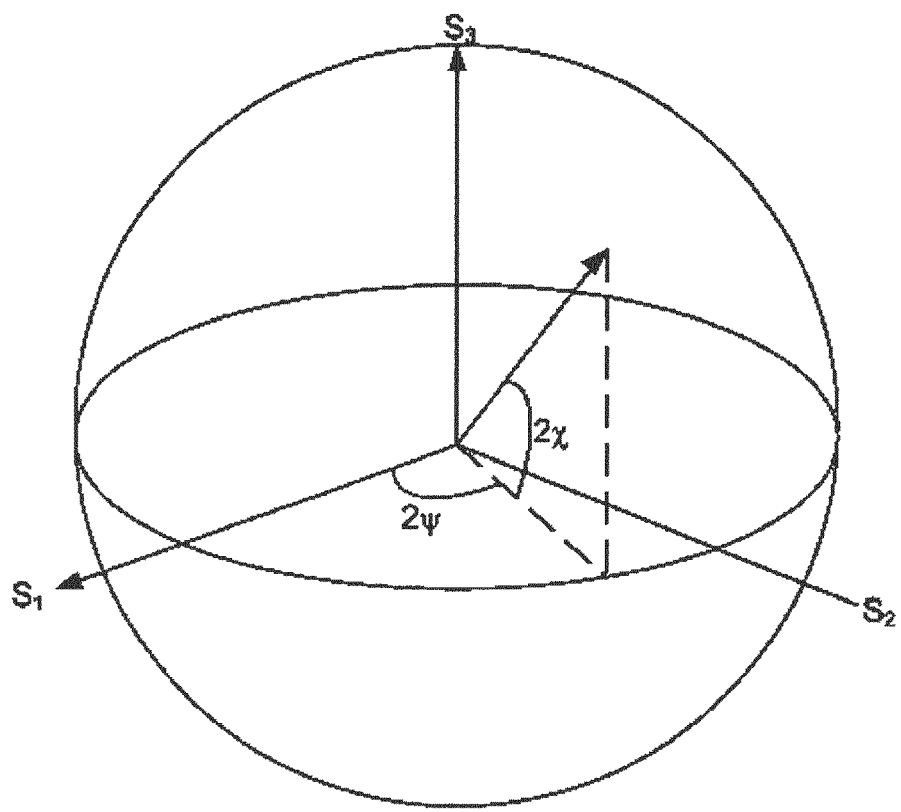
FIG. 18 illustrates a Poincare sphere for explaining Stokes vectors.

FIG. 17 illustrates a dual channel PCI optical device 1700 according to an embodiment of the invention that may be used as an ellipsometer or polarimeter. The optical device 1700 includes a beam splitter 1701 that receives light from a object to be measured and splits the light into two channels. One of the channels include a polarization modifying element 1702, biaxial crystal 1703 and optical detector 1704, in that order. The other of the channels includes a biaxial crystal 1705 and optical detector 1706, but no polarization modifying element.

It should be noted that all of the optical devices as shown in FIGS. 5-7 may include an optical detector arranged to detect light that has passed through the optical elements.

The devices and systems may be used with a "thick" or "thin" biaxial crystal. A crystal is thought of as thick if the radius $R_0$ of the rings is above 3*w, w being the spot dimension.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method comprising:
providing a biaxial crystal;
inputting light either unpolarized or circularly polarized from an unknown object through the biaxial crystal;
providing a polarizing element consisting of either one of a circular polarizer, a linear polarizer, a linear polarizing beamsplitter or a linear polarizer and a controllable rotator, positioned after the biaxial crystal with respect to the propagation of the initially incident light, wherein a geometrical axis traverses through the biaxial crystal and the polarizing element, wherein the optic axis of the biaxial crystal is along the geometrical axis, and is split in two conjugate axes after the polarizing beam splitter whether using a linear polarizing beamsplitter, wherein the initial light distribution has been imaged by an optical system onto a detector, the imaging condition being determined such that the image would fall on the detector if the biaxial crystal will have been replaced by an isotropic material with an index equal to about the biaxial crystal median index, detecting the distribution of intensity of the light in one, two or more polarization states in a plane perpendicular to the geometrical axis, wherein the detected distribution of light is proportional to a derivative in one axis of the initial light distribution;
imaging features of the unknown object from mathematical combinations of the detected distribution of intensity; and
outputting the imaged features of the unknown object.

2. The method of claim 1, wherein the object is made of an array of dense lines and the lines frequency is doubled in the outputted light distribution.

3. The method of claim 1, wherein the incident light is provided from an assembly of points.

4. The method of claim 1, wherein the incident light consists of a plurality of wavelengths.

5. The method of claim 1, wherein the object is a fiducial mark, and data retrieved based on the light received by the detector provides the position of the fiducial mark.

6. The method of claim 1, further comprising: determining the type of features based on its transfer function through the biaxial crystal and a circular analyzer; segmenting the distribution of intensity into regions containing a single type of feature; calculating the centers of peaks of the detected distribution of intensity of light as a location in the plane for each type of feature; and outputting the locations in the plane as the locations of the features in the plane, for each type of feature.

7. The method of claim 6, further comprising: counting the total number of features per unit area for each type of feature.

8. The method of claim 1, wherein the unknown object comprises pits and lands on the surface of an optical disk, the method further comprising: reading information stored in the pits and lands.

9. The method of claim 8, wherein the optical system projecting and receiving the light from the spot on the disk uses a lens with numerical aperture lower than one calculated using Rayleigh criterion.

10. The method of claim 1, wherein the object is a phase object.

11. The method of claim 1, wherein the unknown object is a measurement mark, the method further comprising: calculating the position of the measurement mark based on the detected distribution of intensity.

12. The method of claim 1, further comprising: splitting the input light into two input channels with Inverted circular polarization, either sequentially or spatially.

13. The method of claim 12, wherein the detector comprises four regions, wherein the light emerging from each one of the combination of input and output channels is incident on one of the regions of the detector.

14. The method of claim 12, wherein the detector comprises only two regions, wherein the light emerging from each two of the combinations of input and output channels are incident concurrently on the two regions of the detector and the two other combinations are recorded sequentially to the two first ones.

15. The method of claim 12, wherein the detector comprises a single region and all four combinations of input and output channels are recorded sequentially.

16. The method of claim 12, further comprising recording the output, imaged features of the unknown object.

17. The method of claim 12, wherein the unknown object is a measurement mark, the method further comprising: calculating the position of the measurement mark based on the detected distribution of intensity.

18. The method of claim 12, wherein the object is a phase Object.

19. The method of claim 1, further comprising: recording the imaged features of the unknown object.

20. The method of claim 19, wherein the unknown object comprises pits and lands on the surface of an optical disk, the method further comprising: reading information stored in the pits and lands.

21. The method of claim 20, wherein the optical system projecting and receiving the light from the spot on the disk uses a lens with numerical aperture lower than one calculated using Rayleigh criterion.

* * * * *